United States Patent
Nakagawa et al.

(10) Patent No.: US 9,662,910 B2
(45) Date of Patent: May 30, 2017

(54) PRINTER

(71) Applicant: Brother Kogyo Kabushiki Kaisha, Nagoya-shi, Aichi-ken (JP)

(72) Inventors: Kazuya Nakagawa, Nagoya (JP); Yoshiyasu Yoshido, Anpachi-gun (JP); Koichi Kondo, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/055,796

(22) Filed: Feb. 29, 2016

(65) Prior Publication Data

US 2016/0279975 A1 Sep. 29, 2016

(30) Foreign Application Priority Data

Mar. 26, 2015 (JP) .................................. 2015-065267

(51) Int. Cl.
| | |
|---|---|
| *B41J 11/66* | (2006.01) |
| *B41J 11/70* | (2006.01) |
| *H04N 1/00* | (2006.01) |
| *G03G 15/00* | (2006.01) |

(52) U.S. Cl.
CPC .............. *B41J 11/663* (2013.01); *B41J 11/66* (2013.01); *B41J 11/703* (2013.01); *G03G 15/6523* (2013.01); *H04N 1/00676* (2013.01)

(58) Field of Classification Search
CPC . B41J 3/4075; G06K 15/007; G06K 15/1818; G06K 15/1821
See application file for complete search history.

(56) References Cited

U.S. PATENT DOCUMENTS

| | | | | |
|---|---|---|---|---|
| 5,447,383 A | * | 9/1995 | Hirono | .................... B41J 3/4075 358/304 |
| 2003/0202202 A1 | * | 10/2003 | Miyata | ................. B41J 11/0075 358/1.14 |
| 2005/0213149 A1 | * | 9/2005 | Kuwahara | .............. G06K 15/00 358/1.15 |
| 2006/0216099 A1 | | 9/2006 | Sakano et al. | |
| 2010/0039665 A1 | * | 2/2010 | Tsukada | ................... B41J 11/66 358/1.15 |

FOREIGN PATENT DOCUMENTS

| | | |
|---|---|---|
| JP | H07-285240 A | 10/1995 |
| JP | 2006181750 A | 7/2006 |

* cited by examiner

*Primary Examiner* — Shelby Fidler
(74) *Attorney, Agent, or Firm* — Banner & Witcoff, Ltd.

(57) ABSTRACT

The disclosure discloses a printer including a controller. The controller executes a reception process, a determination process, a first notification transmission process, a second notification transmission process, a data acquisition process, and a coordination control process. In the determination process, it is determined whether any of a print formation process, a feeding process, and a standby process is executed when a first print instruction is received. In the case that the print formation process or the feeding process is in execution, a first notification is transmitted in the first notification transmission process. In the case that the standby process is in execution, a second notification is transmitted in the second notification transmission process. In the case that none of the print formation process, the feeding process, and the standby process is in execution, print data included in the first print instruction is acquired in the data acquisition process.

7 Claims, 15 Drawing Sheets

REGULAR PRINT MODE

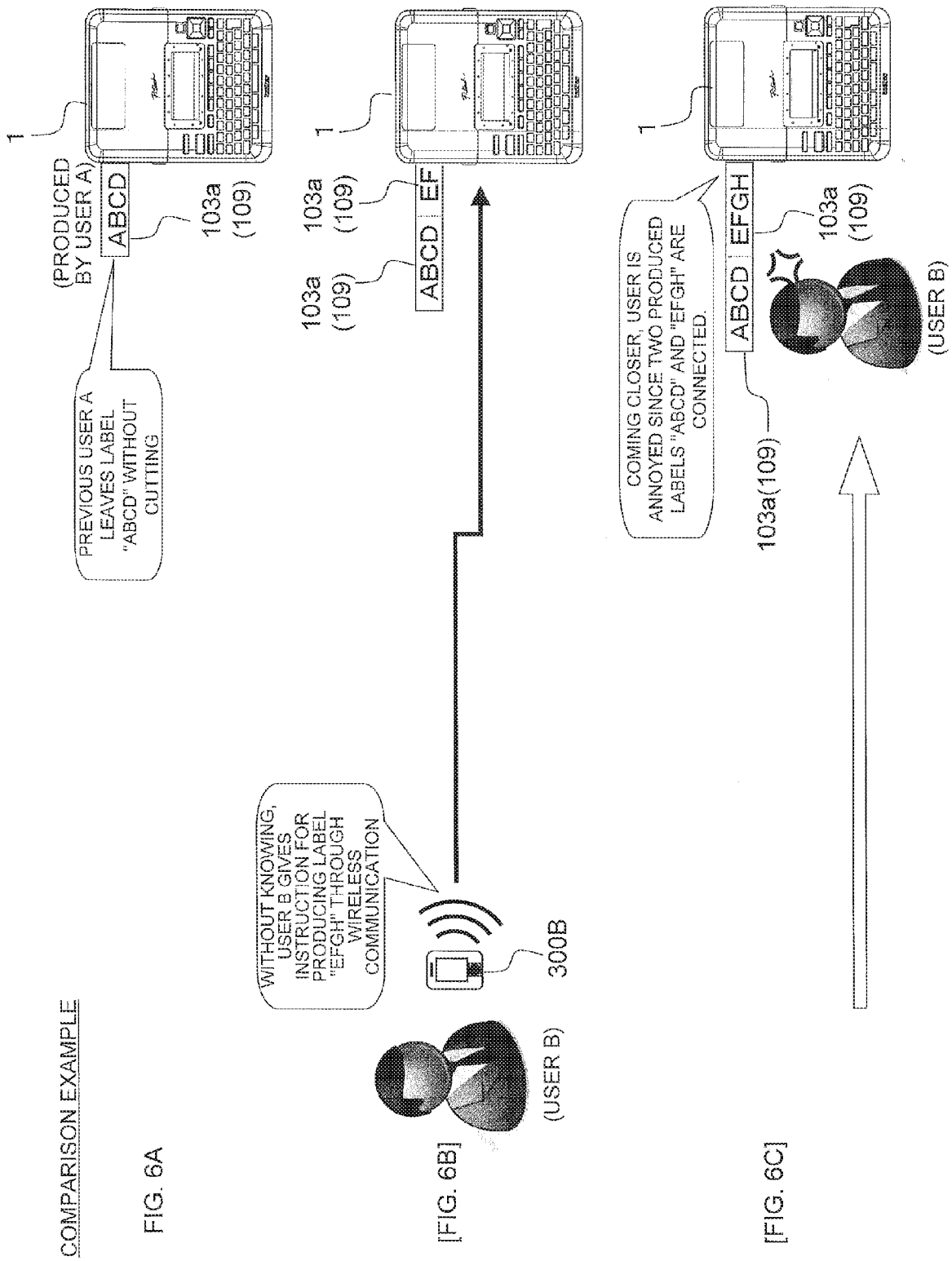

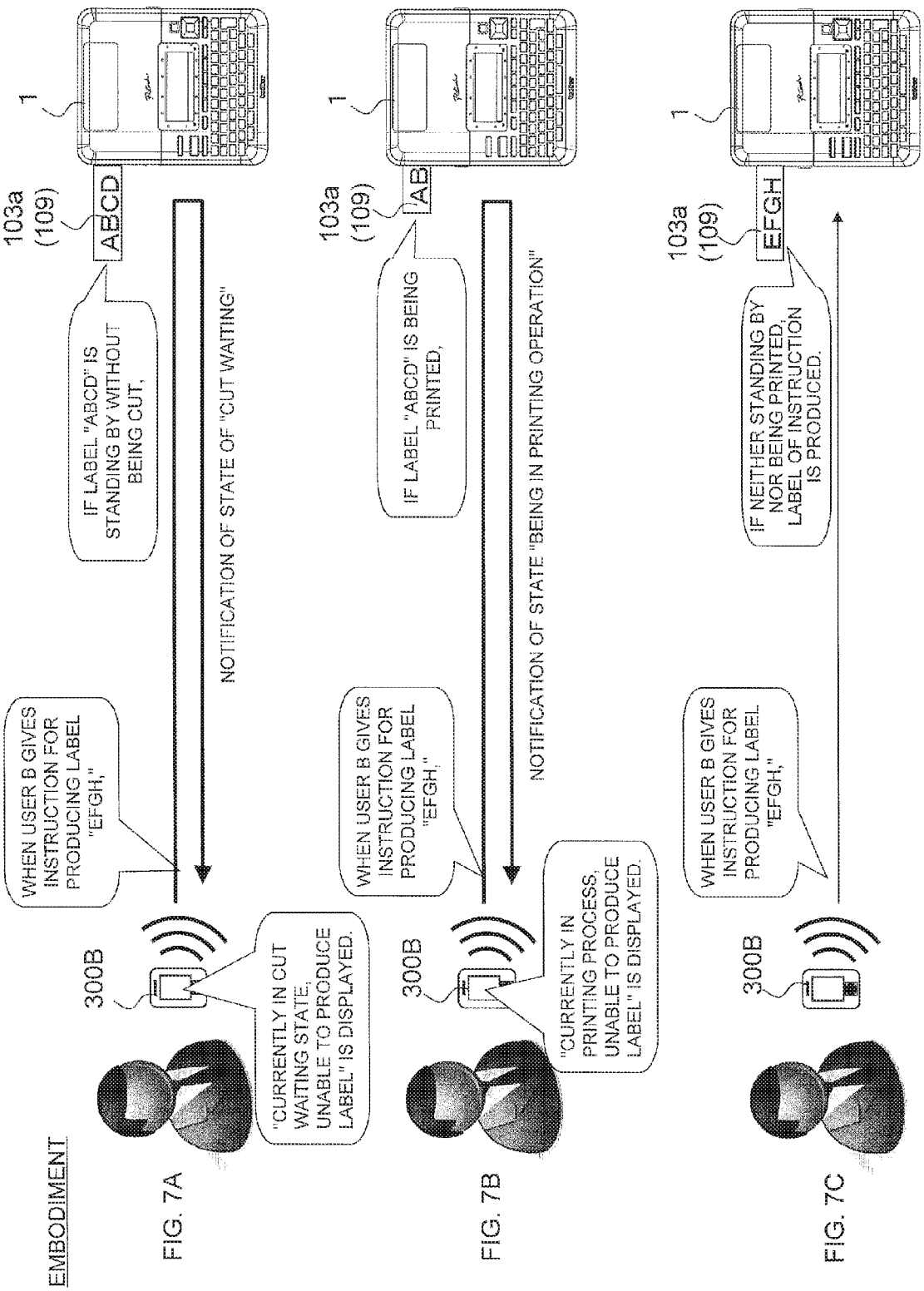

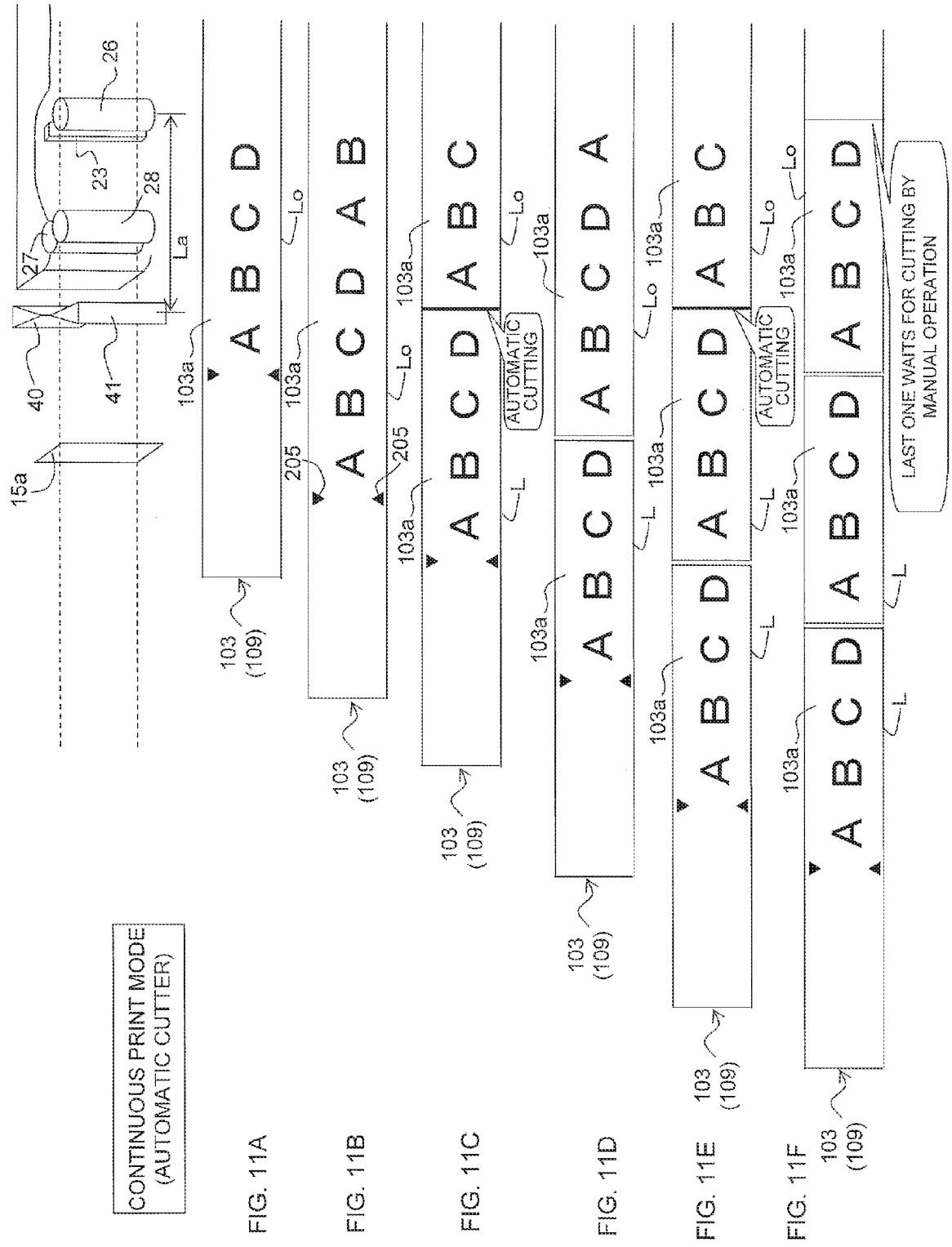

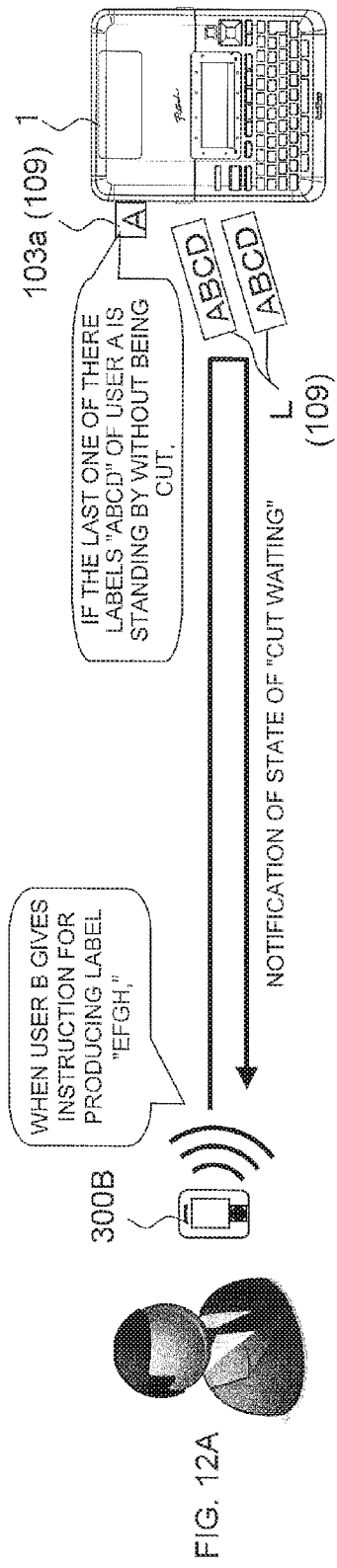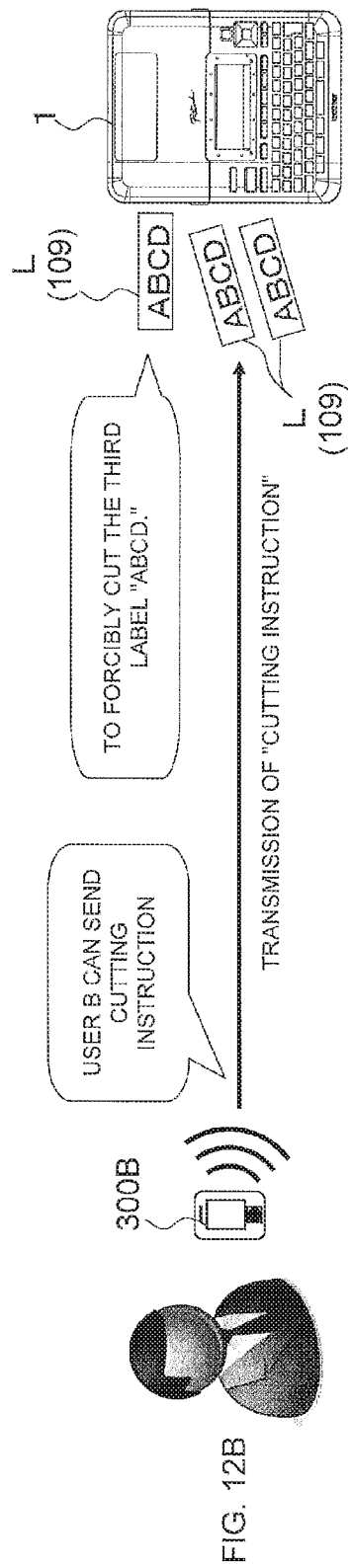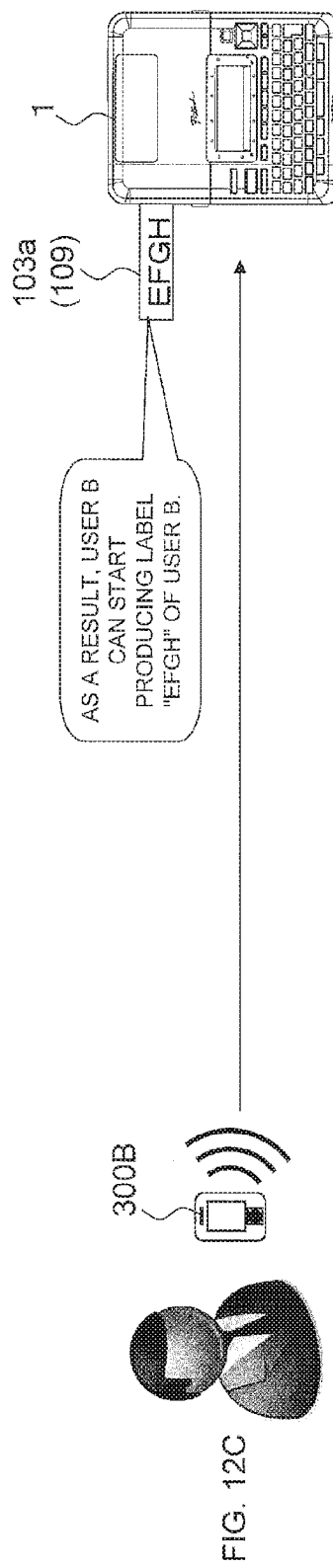

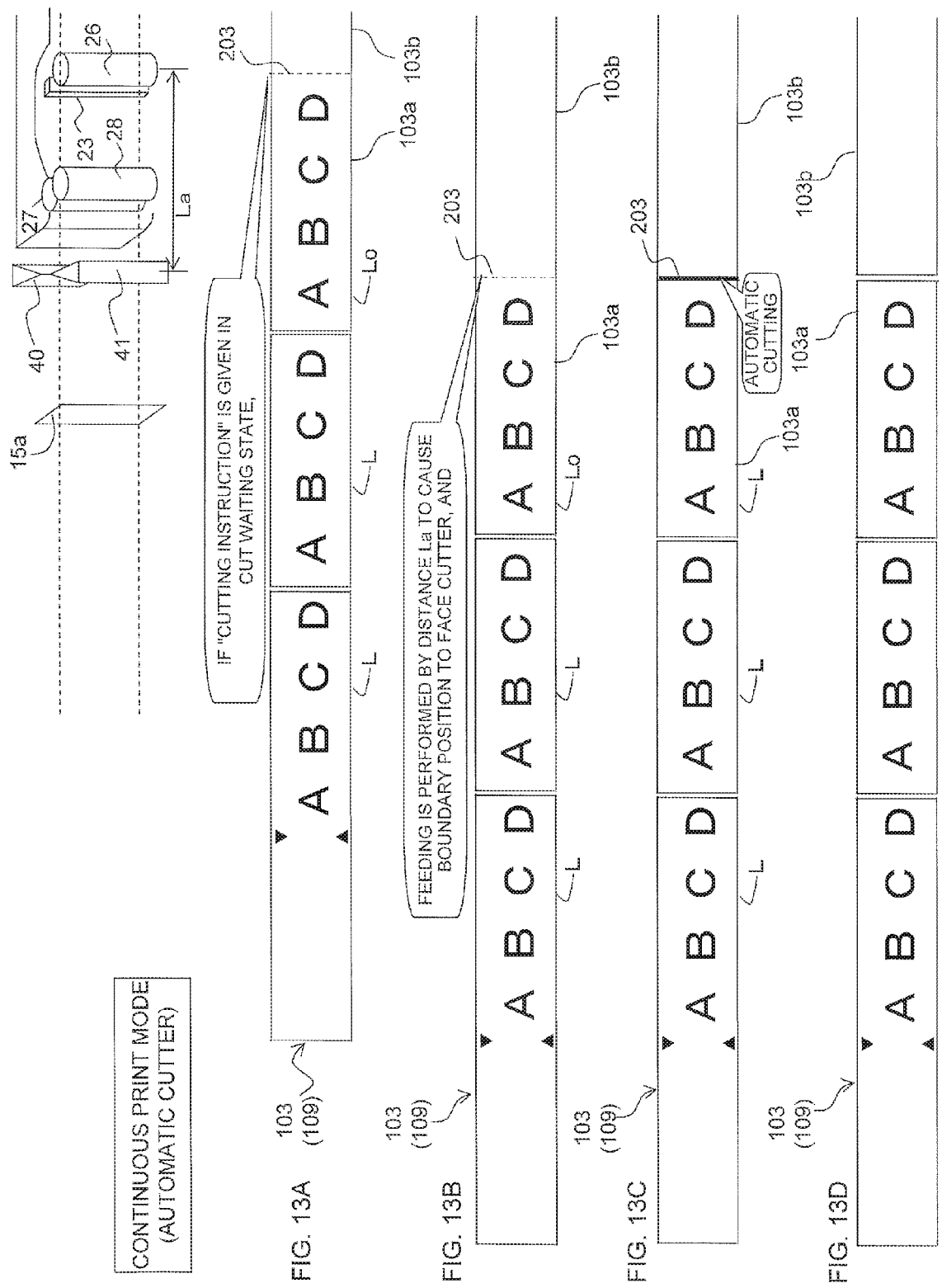

PRINTER

CROSS-REFERENCE TO RELATED APPLICATION

The present application claims priority from Japanese Patent Application No. 2015-065267, which was filed on Mar. 26, 2015, the disclosure of which is incorporated herein by reference in its entirety.

BACKGROUND

Field

The present disclosure relates to a printer cutting a printed print-receiving tape to produce a print tape.

Description of the Related Art

A printer is known that cuts a printed print-receiving tape to produce a print tape. After a desired print is formed on a fed print-receiving tape in this printer of prior art, the print-receiving tape is further fed and the feeding is stopped when a transport-direction upstream end part of a portion of the print formed on the print-receiving tape faces a cutter. Subsequently, when an operator manually operates a cutter lever to actuate the cutter for cutting, the portion having the desired print formed thereon is separated from the other portion and the print tape is produced.

It is recently increasingly proposed to configure a printer producing a print tape as in the prior art such that the printer is operated by an operation terminal connected through mutual recognition communication, for example. In this case, reception of a print instruction from the operation terminal triggers formation of a desired print corresponding to the print instruction on a fed print-receiving tape and, after feeding is stopped as described above, the tape is cut by an operator's manual operation.

In this case, for example, the operation terminal connected through the mutual recognition communication as described above may be located at a place relatively far from the printer. In this case, (since it is difficult for an operator to visually recognize a situation of the printer far away from the place of the operation terminal) the operator may transmit the print instruction from the operation terminal to the printer without confirming that the print tape produced immediately before is not cut. In such a case, while the print tape produced immediately before is connected without being cut, a new print tape corresponding to the print instruction is produced. This causes an inconvenience because when going to the printer to acquire the print tape, the operator notices the trouble of the connected state for the first time and is annoyed.

SUMMARY

It is an object of the present disclosure to provide a printer capable of avoiding the inconvenience of the print tape produced in the connected state even if a print instruction is transmitted to the printer without cutting a print tape produced immediately before.

In order to achieve the above-described object, according to the aspect of the present application, there is provided a printer comprising a feeder configured to feed a print-receiving tape, a printing head that is configured to perform printing on the print-receiving tape and is disposed on a feeding path of the feeder, a cutter that is configured to cut the print-receiving tape in a thickness direction and is disposed downstream of the printing head along the feeding path, a communication device configured to perform mutual recognition communication including connection authentication with at least one operation terminal, and a controller, the controller being configured to execute a reception process for receiving a first print instruction from a first operation terminal by the mutual recognition communication via the communication device, a determination process for determining whether any of (i) a print formation process for performing a desired print formation while feeding the print-receiving tape, (ii) a feeding process for further feeding the print-receiving tape after completion of the print formation process such that the print-receiving tape is positioned by stopping the feeding when a boundary position faces the cutter wherein the boundary position is defined as a boundary between a printed tape portion having the desired print formed thereon and an unprinted tape portion in the print-receiving tape, and (iii) a standby process for waiting for, after positioning in the feeding process, the cutter to cut the boundary position to separate the printed tape portion from the unprinted tape portion located upstream than the boundary position after the cutting in a feeding direction, is being executed based on a second print instruction from a second operation terminal preceding the first print instruction when the first print instruction is received in the reception process, a first notification transmission process for, in the case that it is determined in the determination process that the print formation process or the feeding process is in execution, transmitting a first notification indicative of being in a print operation to the first operation terminal by the mutual recognition communication via the communication device, a second notification transmission process for, in the case that it is determined in the determination process that the standby process is in execution, transmitting a second notification indicating of being in standby and waiting for cutting to the first operation terminal by the mutual recognition communication via the communication device, a data acquisition process for, in the case that it is determined in the determination process that none of the print formation process, the feeding process, and the standby process is in execution, acquiring print data included in the first print instruction received in the reception process, and a coordination control process for controlling the feeder and the printing head in a coordinated manner such that the print formation process and the feeding process are executed by using the print data acquired in the data acquisition process.

The printer of the present disclosure has a feeder, a printing head, a cutter, and a controller. This printer is connected to at least one operation terminal through mutual recognition communication via communication means. When a print instruction (second print instruction) is received from an operation terminal (second operation terminal), a desired print corresponding to the print instruction is formed on a print object portion of the fed print-receiving tape under the control of the controller to form a printed tape portion (the print formation process). Subsequently, the print-receiving tape is further fed and is positioned by stopping the feeding when a transport-direction upstream end part of the printed tape portion (in other words, a boundary position that is a boundary between the printed tape portion and an unprinted tape portion) faces the cutter (the feeding process), thereby entering a standby state of waiting for the cutter to cut the boundary position (the standby process). Subsequently, when the cutter is actuated by an operator's manual operation (or by a drive force of cutting driving means), the cutting is performed to separate the printed tape portion having the desired print formed thereon from the unprinted tape portion upstream of the boundary position and a print tape is produced.

In the present disclosure, the controller executes the determination process, the first notification transmission process, and the second notification transmission process. In the determination process, when a first print instruction from the first operation terminal (different form the second operation terminal) is received in the reception process, it is determined whether any of the print formation process, the feeding process, and the standby process based on the second print instruction is in execution. If the print formation process or the feeding process is in execution, a notification of being in print operation (the first notification) is transmitted to the first operation terminal in the first notification transmission process (without acquiring the print data described later). Alternatively, if the standby process is in execution, a notification of being in standby and waiting for cutting (the second notification) is transmitted to the first operation terminal in the second notification transmission process in the same way as above (without acquiring the print data described later). Only when none of the print formation process, the feeding process, and the standby process is in execution, the print data included in the print instruction is acquired in the data acquisition process, and the print formation process and the feeding process are executed under the control of the controller to produce a corresponding print tape.

From the above, even if the print instruction (first print instruction) is transmitted to the printer without cutting the print tape produced immediately before as described above, the inconvenience of the print tape produced in the connected state can be avoided. As a result, operator's convenience can be improved.

BRIEF DESCRIPTION OF THE DRAWINGS

FIG. 6A is a view for explaining a comparison example of the embodiment of the present disclosure.

FIG. 6B is a view for explaining the comparison example of the embodiment of the present disclosure.

FIG. 6C is a view for explaining the comparison example of the embodiment of the present disclosure.

FIG. 7A is a view for explaining how a notification to the operation terminal is performed in accordance with an operation state of the tape printer.

FIG. 7B is a view for explaining how a notification to the operation terminal is performed in accordance with an operation state of the tape printer.

FIG. 7C is a view for explaining how a notification to the operation terminal is performed in accordance with an operation state of the tape printer.

FIG. 11A is a view for explaining an example of a print label producing operation in a continuous print mode corresponding to a modification example in which a printed label tape is forcibly cut in accordance with a cutting instruction based on a user's operation.

FIG. 11B is a view for explaining the example of the print label producing operation in the continuous print mode corresponding to the modification example in which a printed label tape is forcibly cut in accordance with a cutting instruction based on a user's operation.

FIG. 11C is a view for explaining the example of the print label producing operation in the continuous print mode corresponding to the modification example in which a printed label tape is forcibly cut in accordance with a cutting instruction based on a user's operation.

FIG. 11D is a view for explaining the example of the print label producing operation in the continuous print mode corresponding to the modification example in which a printed label tape is forcibly cut in accordance with a cutting instruction based on a user's operation.

FIG. 11E is a view for explaining the example of the print label producing operation in the continuous print mode corresponding to the modification example in which a printed label tape is forcibly cut in accordance with a cutting instruction based on a user's operation.

FIG. 11F is a view for explaining the example of the print label producing operation in the continuous print mode corresponding to the modification example in which a printed label tape is forcibly cut in accordance with a cutting instruction based on a user's operation.

FIG. 12A is a view for explaining how a notification to the operation terminal is performed and how a cutting instruction is transmitted from the operation terminal for automatic cutting in accordance with an operation state of the tape printer.

FIG. 12B is a view for explaining how a notification to the operation terminal is performed and how a cutting instruction is transmitted from the operation terminal for automatic cutting in accordance with an operation state of the tape printer.

FIG. 12C is a view for explaining how a notification to the operation terminal is performed and how a cutting instruction is transmitted from the operation terminal for automatic cutting in accordance with an operation state of the tape printer.

FIG. 13A is a view for explaining detailed behavior of the automatic cutting.

FIG. 13B is a view for explaining the detailed behavior of the automatic cutting.

FIG. 13C is a view for explaining the detailed behavior of the automatic cutting.

FIG. 13D is a view for explaining the detailed behavior of the automatic cutting.

DETAILED DESCRIPTION OF THE PREFERRED EMBODIMENTS

An embodiment of the present disclosure will now be described with reference to the drawings.

<System Configuration>

Figure 1:
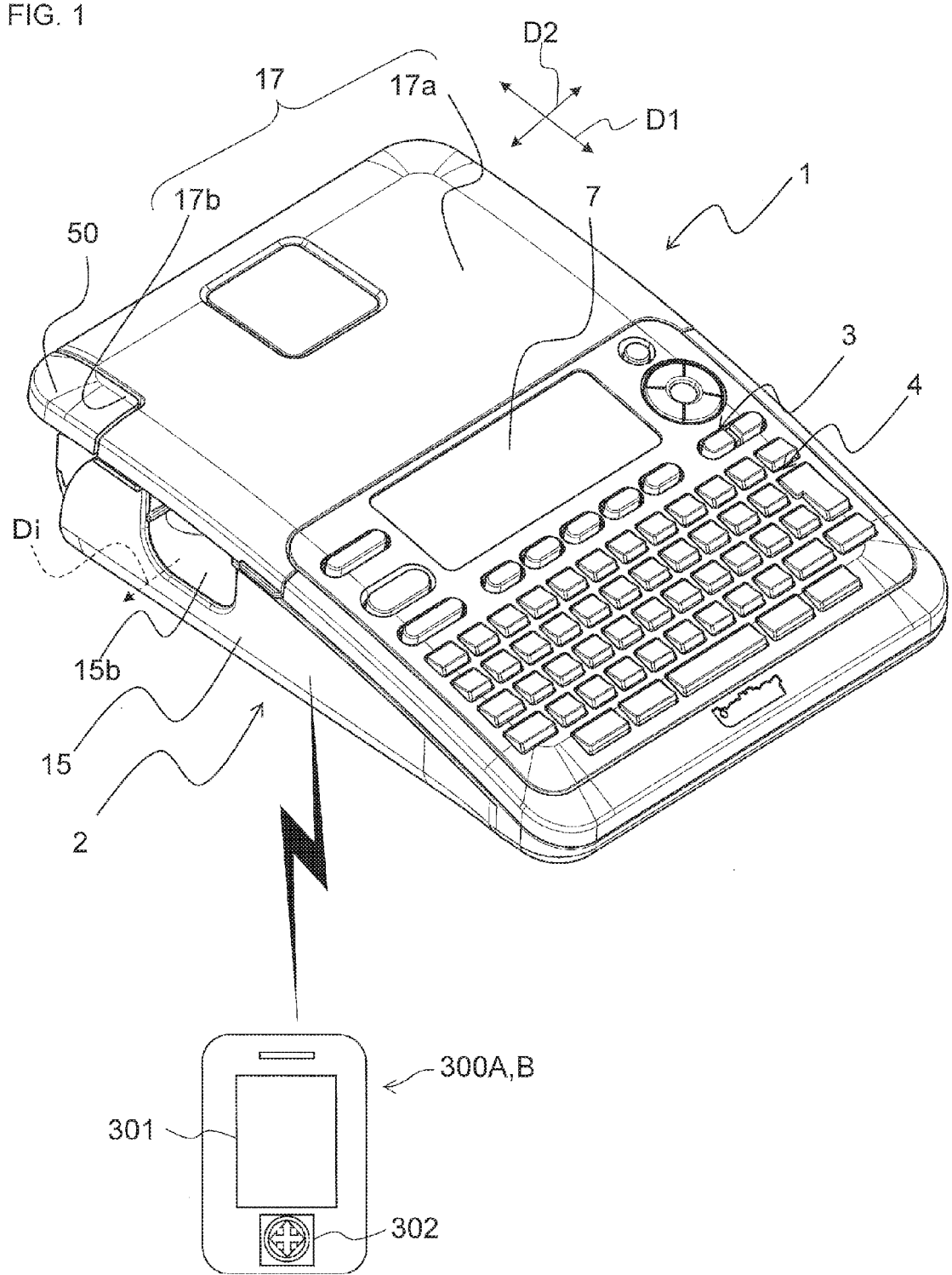
FIG. 1 is a view showing a tape printer to which an embodiment of the present disclosure is applied, along with an operation terminal.

FIG. 1 shows a tape printer (corresponding to a printer) of this embodiment along with an operation terminal capable of operating the tape printer. In FIG. 1, a tape printer 1 and at least one operation terminal 300 (in this example, two operation terminals 300A, 300B as described later. simply referred to as the "operation terminal 300" if no distinction is made therebetween) are connected through well-known mutual recognition wireless communication or mutual recognition wired communication (achieved by normal cable connection) such that information can be transmitted and received.

The operation terminal 300 is, for example, an information terminal such as a PDA (personal digital assistance) and a smartphone (portable telephone with a PDA function) having the above described communication function. This operation terminal 300 has, for example, a touch panel 301 and an operation button 302. The touch panel 301 has a display function of displaying various pieces of information and messages on a liquid crystal display etc. and allows a user to input desired instructions and information in combination with the above described operation button 302. Therefore, subsequently, the above described display function portion of the touch panel will be simply referred to as a "display part 301", and the above described operation function portion and the above described operation button of the touch panel will collectively simply be referred to as an "operation part 302". The operation terminal 300 of this example can attempt to transmit/receive information to/from the tape printer 1 through the above described mutual recognition wireless communication and can cause the tape printer 1 to print desired printing data (described later in detail).

<Configuration of Tape Printer>

Figure 2:
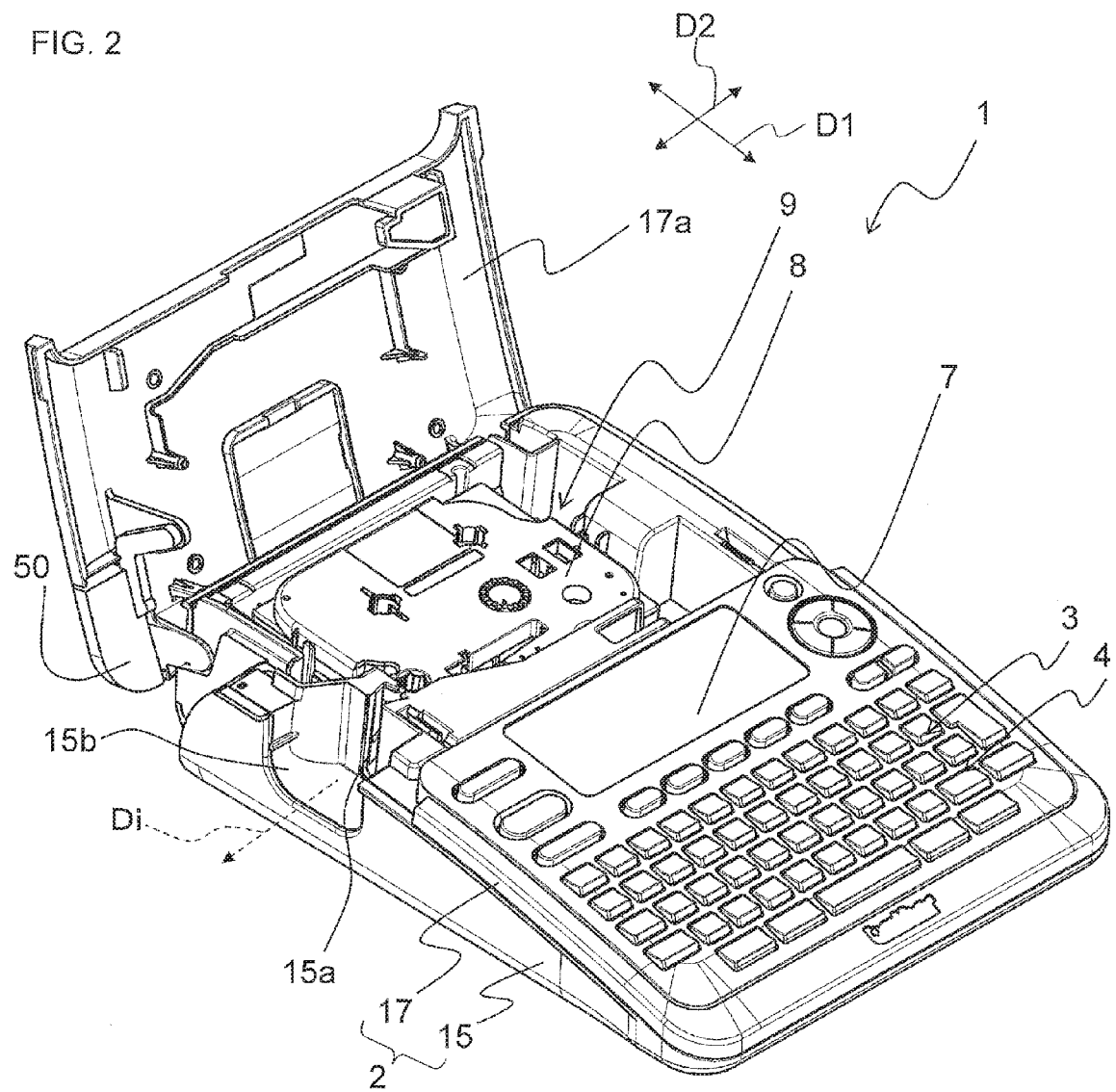
FIG. 2 is a perspective view of an exterior appearance of the tape printer with a cartridge cover opened.

The above described tape printer 1 will be described. As shown in FIGS. 1 and 2, the tape printer 1 includes a housing 2 making up an outer contour thereof. The housing 2 includes a resin lower cover 15 making up an apparatus lower surface and integrated with apparatus side surfaces as well as a resin upper cover 17 making up an apparatus upper surface.

Figure 3:
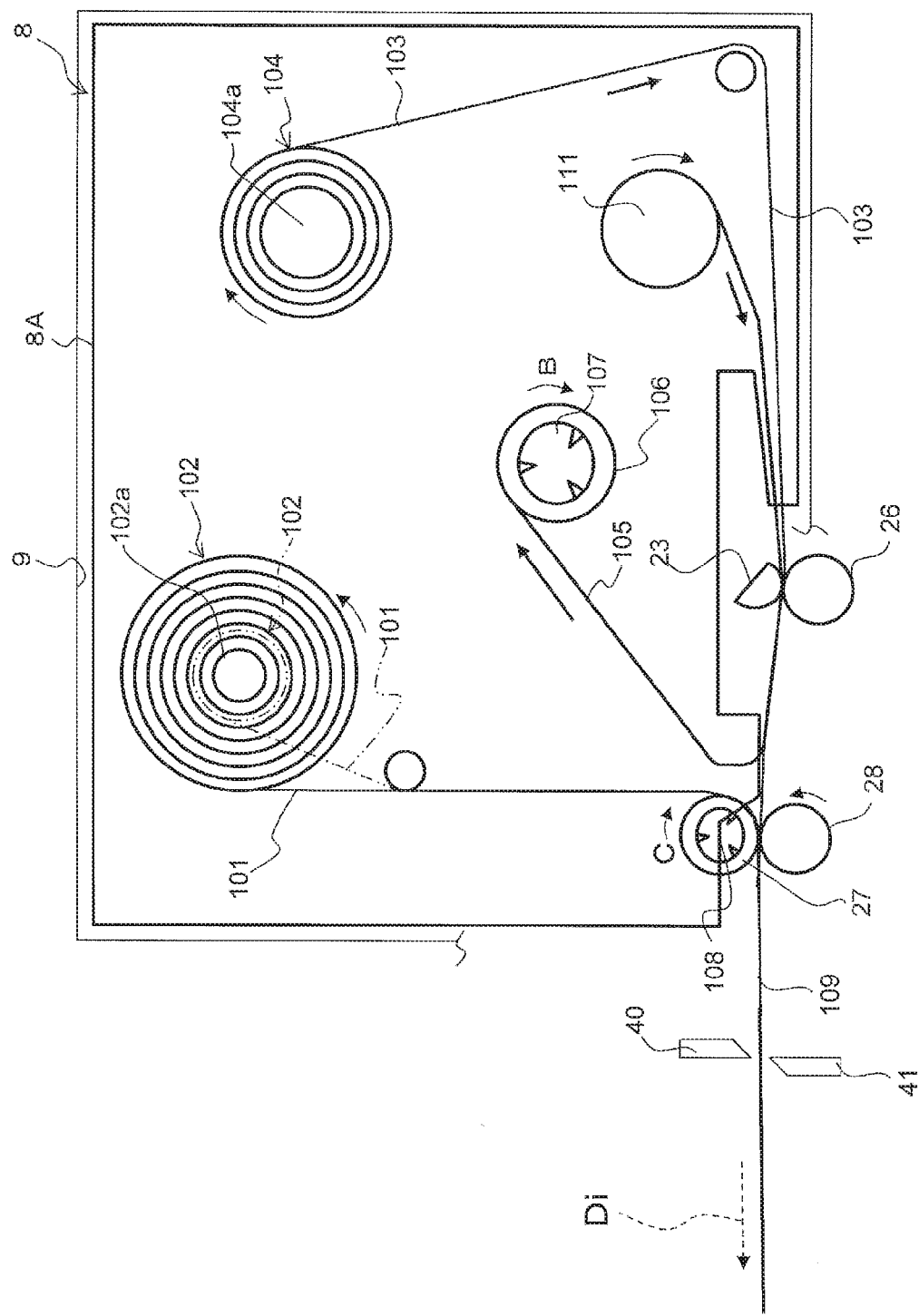
FIG. 3 is a conceptual plane view of an internal structure of a cartridge.

A side surface of the lower cover 15 includes a recessed part 15b and a discharging exit 15a formed at the center of an innermost part inside the recessed part to discharge a printed label tape 109 (see FIG. 3 described later).

The upper cover 17 is disposed with, from the front side toward the rear side, a keyboard 3 for performing various operations such as character input, functional keys 4 such as a power switch and a print key for causing the tape printer 1 to perform various functions, and a transparent panel 7 mounted to close an opening part like a rectangular opening, for example.

The upper cover 17 includes a lid-like cartridge cover 17a that can be opened for mounting a tape cassette-like cartridge 8 on the upper surface rear part side and that opens and closes a cartridge holder 9. This cartridge cover 17a has a cutout part 17b disposed to an end part in a direction D1 (see FIG. 1) orthogonal to a direction Di (see FIG. 1) of a tape feeding path in the vicinity of the above described discharging exit 15a and in a direction D2 (see FIG. 1) orthogonal thereto. A cut lever 50 used as an operation lever for cutting the above described printed label tape 109 is disposed such that the cut lever 50 is received in the cutout part 17b.

The tape printer 1 has the cartridge holder 9 disposed on the upper surface rear part side thereof such that the cartridge 8 is detachably mounted. This cartridge holder 9 is always closed by the above described cartridge cover 17a (see FIG. 1) and, when the cartridge cover 17a is opened, the cartridge holder 9 is exposed (see FIG. 2).

Detailed structures of the cartridge 8 and the cartridge holder 9 will be described with reference to FIG. 3. The cartridge 8 has a housing 8A, a first roll 102 (actually having a spiral shape and simplified into a concentrically circular shape in FIG. 3) having a wound belt-shaped base tape 101 located in the housing 8A, a second roll 104 (actually having a spiral shape and simplified into a concentrically circular shape in FIG. 3) having a wound transparent print-receiving tape 103 with substantially the same width as the above described base tape 101, a ribbon supply side roll 111 feeding out an ink ribbon 105 (not necessary if the print-receiving tape is a thermal tape), a ribbon take-up roller 106 taking up the ink ribbon 105 after print, and a feeding roller 27 rotatably supported in the vicinity of a tape discharging part of the cartridge 8.

The first roll 102 has the above described base tape 101 wound around a reel member 102a. The base tape 101 includes, for example, a bonding adhesive layer, a base film, an affixing adhesive layer, and a separation sheet laminated in this order from the inner wound side toward the opposite side. The second roll 104 has the above described print-receiving tape 103 wound around a reel member 104a.

The feeding roller 27 feeds the above described base tape 101 and the above described print-receiving tape 103 in the direction Di described above while pressing and bonding the tapes into the above described printed label tape 109.

On the downstream side of the feeding roller 27 and a pressure roller 28 along the feeding path of the printed label tape 109 (i.e., on the downstream side of a printing head 23 described later), a fixed blade 40 is disposed along with a movable blade 41 advancing toward the above described fixed blade 40 in accordance with an manual operation of the above described cut lever 50 to cut the printed label tape 109 in a thickness direction in cooperation with the fixed blade 40.

On the other hand, the cartridge holder 9 is disposed with a ribbon take-up roller driving shaft 107 for taking up the above described ink ribbon 105 used in the cartridge 8, and a feeding roller driving shaft 108 for feeding the above described printed label tape 109. The ribbon take-up roller 106 and the feeding roller 27 described above are rotationally driven in conjunction with each other by transmitting a drive force of a feeding motor not shown to the above described ribbon take-up roller driving shaft 107 and the above described feeding roller driving shaft 108. The printing head 23 performing desired printing on the fed print-receiving tape 103 is disposed on the cartridge holder 9 such that the printing head 23 is positioned at an opening part of the cartridge 8 when the cartridge 8 is mounted. The printing head 23 is located away from the above described movable blade 41 and the fixed blade 40 at a predetermined separation distance La along the tape feeding path (see, e.g., FIG. 5 described later).

<General Operation of Producing Print Tape>

When the cartridge 8 is mounted on the above described cartridge holder 9 in the above described configuration, the print-receiving tape 103 and the ink ribbon 105 are interposed between the printing head 23 and a platen roller 26 facing thereto. The base tape 101 and the print-receiving tape 103 are interposed between the feeding roller 27 and the pressure roller 28 facing thereto. The ribbon take-up roller 106 and the feeding roller 27 are then rotationally driven in a synchronized manner in respective directions indicated by arrows B and C in FIG. 3. As a result, the feeding roller 27, the pressure roller 28, and the platen roller 26 are rotated, and the base tape 101 is fed out from the first roll 102 and supplied to the feeding roller 27. On the other hand, the print-receiving tape 103 is fed out from the second roll 104 and a print-head driving circuit 31 (see FIG. 4 described later) energizes a plurality of heat generation elements of the printing head 23. As a result, a print is printed on a back surface of the print-receiving tape 103.

The above described base tape 101 and the print-receiving tape 103 after completion of the above described printing are bonded and integrated by the above described feeding roller 27 and the pressure roller 28 into the printed label tape 109, which is fed outside the cartridge 8 from the tape discharging part. The ink ribbon 105 after printing to the print-receiving tape 103 is taken up by the ribbon take-up roller 106 by driving the ribbon take-up roller driving shaft 107.

The printed label tape 109 fed outside the cartridge 8 as described above is cut by the fixed blade 40 and the movable blade 41 cooperating with each other base on an manual operation of the above described cut lever 50, and a print label L (see FIG. 5 described later. corresponding to a print tape) is produced. Since the printed label tape 109 includes the print-receiving tape 103 after printing, the fixed blade 40 and the movable blade 41 fulfill a function of cutting the print-receiving tape 103 after printing. As described above, the cutting in this case is achieved by transmitting the manual operation of the above described cut lever 50 by a user via a mechanism not shown to the movable blade 41 and causing the movable blade 41 to advance toward the fixed blade 40 so that the movable blade 41 and the fixed blade 40 are closed like scissors.

<Functional Configurations of Tape Printer and Operation Terminal>

Functional configurations of the tape printer 1 and the operation terminal 300 will be described with reference to FIG. 4.

Figure 4:
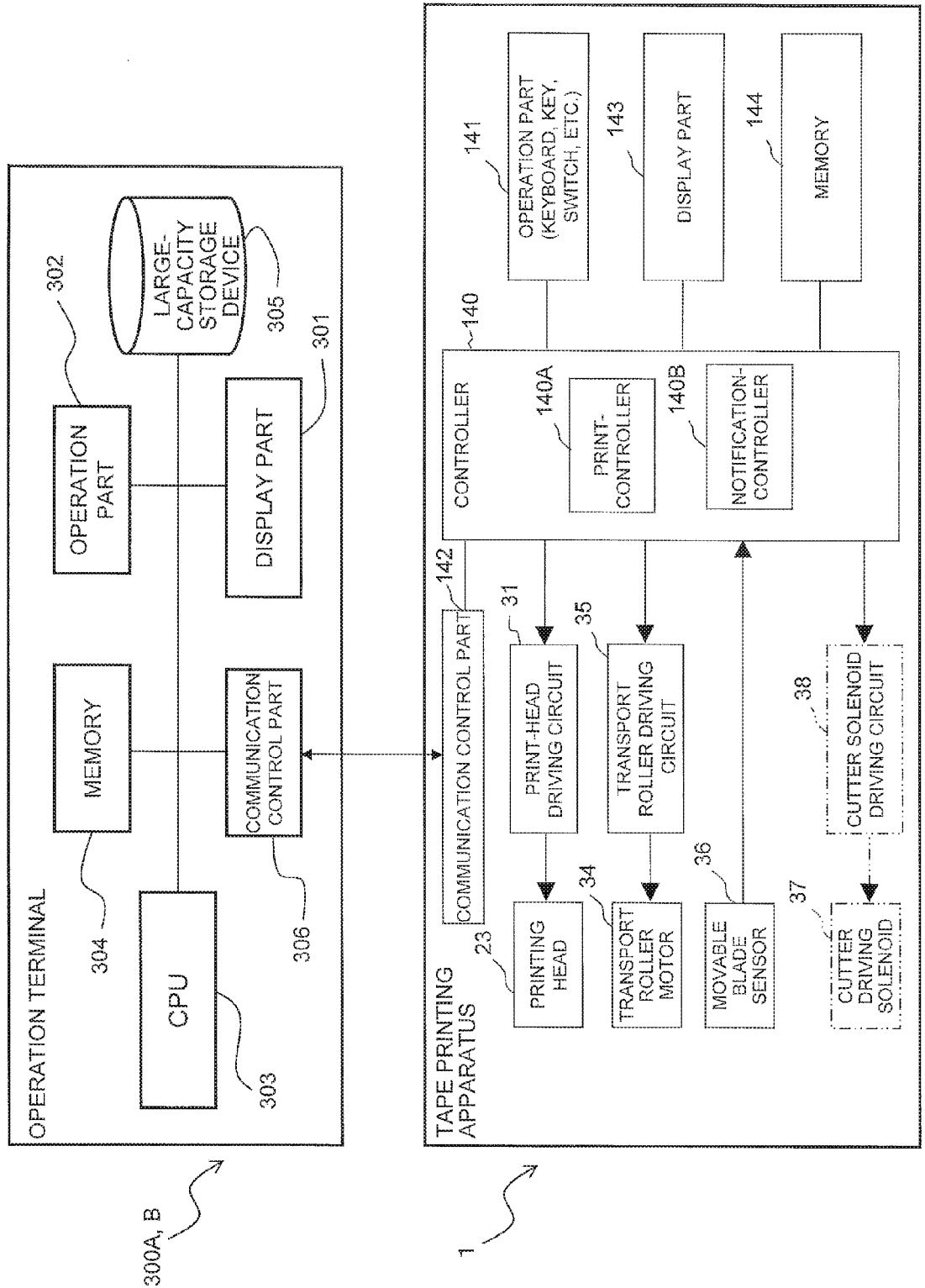
FIG. 4 is a block diagram of functional configurations of the tape printer and the operation terminal.

In FIG. 4, the tape printer 1 includes the above described printing head 23 performing desired printing on the print-receiving tape 103, the print-head driving circuit 31 controlling and causing the printing head 23 to perform a print operation of desired print contents for the print-receiving tape 103, a transport roller motor 34 driving the above described platen roller 26, a transport roller driving circuit 35 controlling the transport roller motor 34, a movable blade sensor 36 detecting a state of completion of cutting of the printed label tape 109 including the print-receiving tape 103 by the movable blade 41, a controller 140 controlling the overall operation of the tape printer 1 via the print-head driving circuit 31, the transport roller driving circuit 35, etc., an operation part 141 such as the above described keyboard 3 and the above described functional keys 4, a display part 143, a memory 144 consisting of a RAM and a ROM, for example, and a communication control part 142 performing the above described mutual recognition communication including connection authentication through a known technique with the above described operation terminal 300. The above described ROM of the memory 144 stores a printing process program for executing procedures of flows of FIGS. 8, 9, 10, etc. described later.

Figure 8:
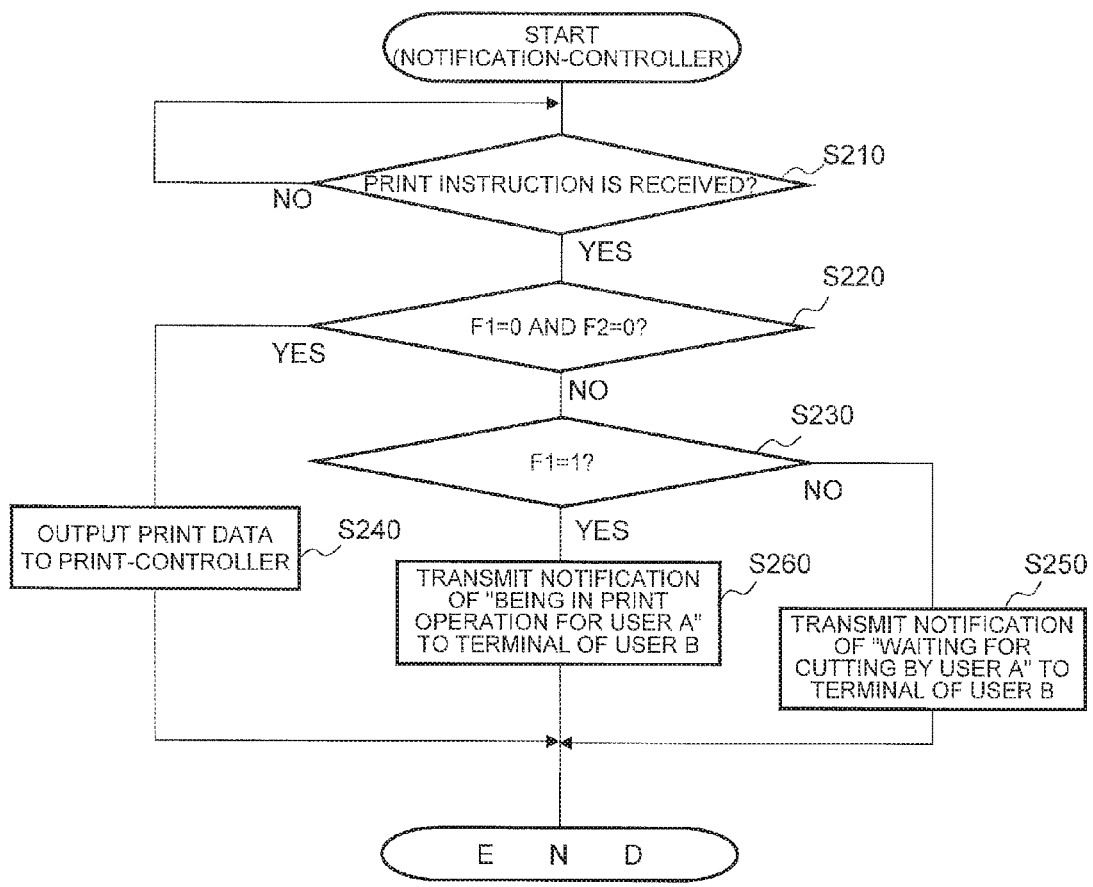
FIG. 8 is a flowchart of a control procedure executed by a notification-controller of a controller.
Figure 9:
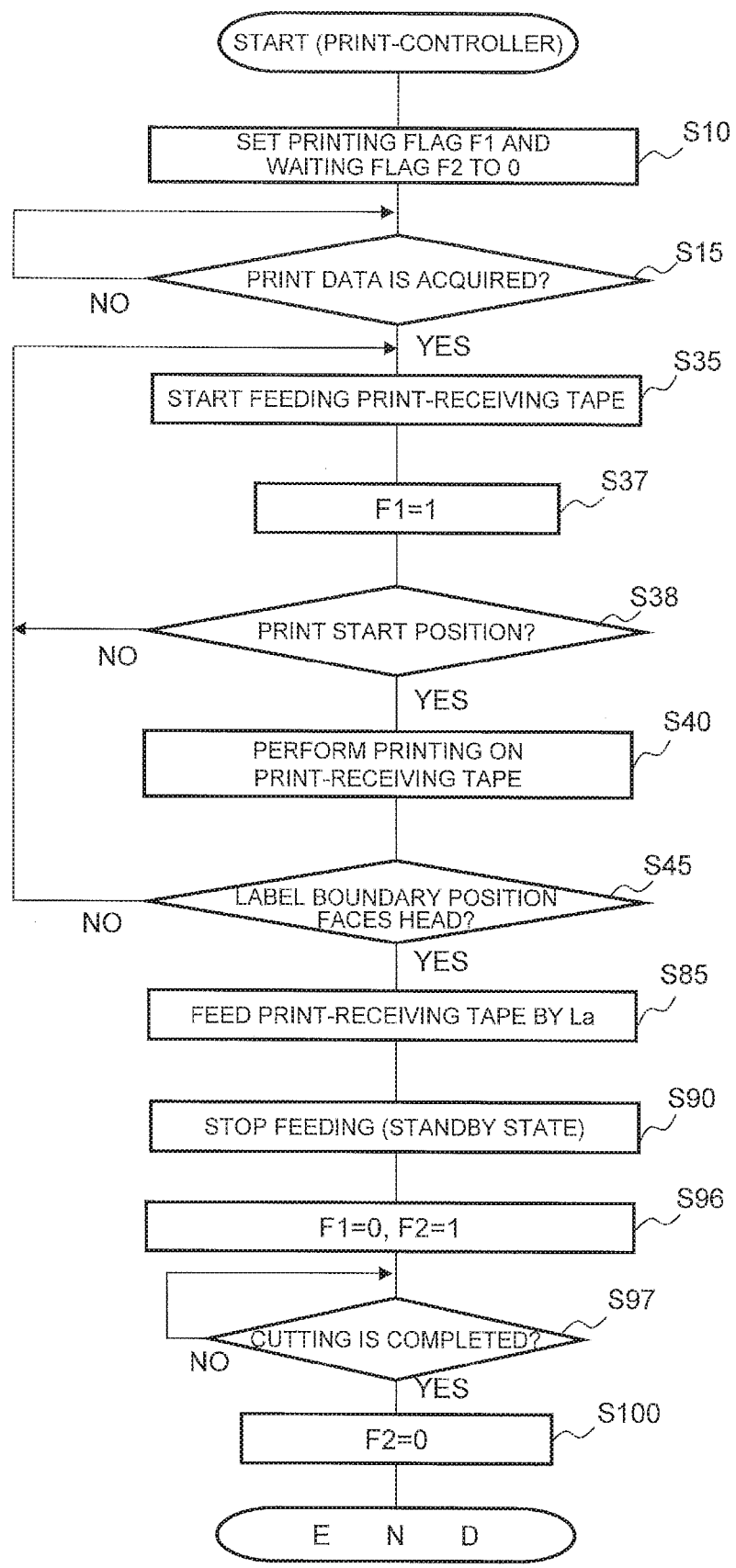
FIG. 9 is a flowchart of a control procedure executed by a print-controller of the controller.
Figure 10:
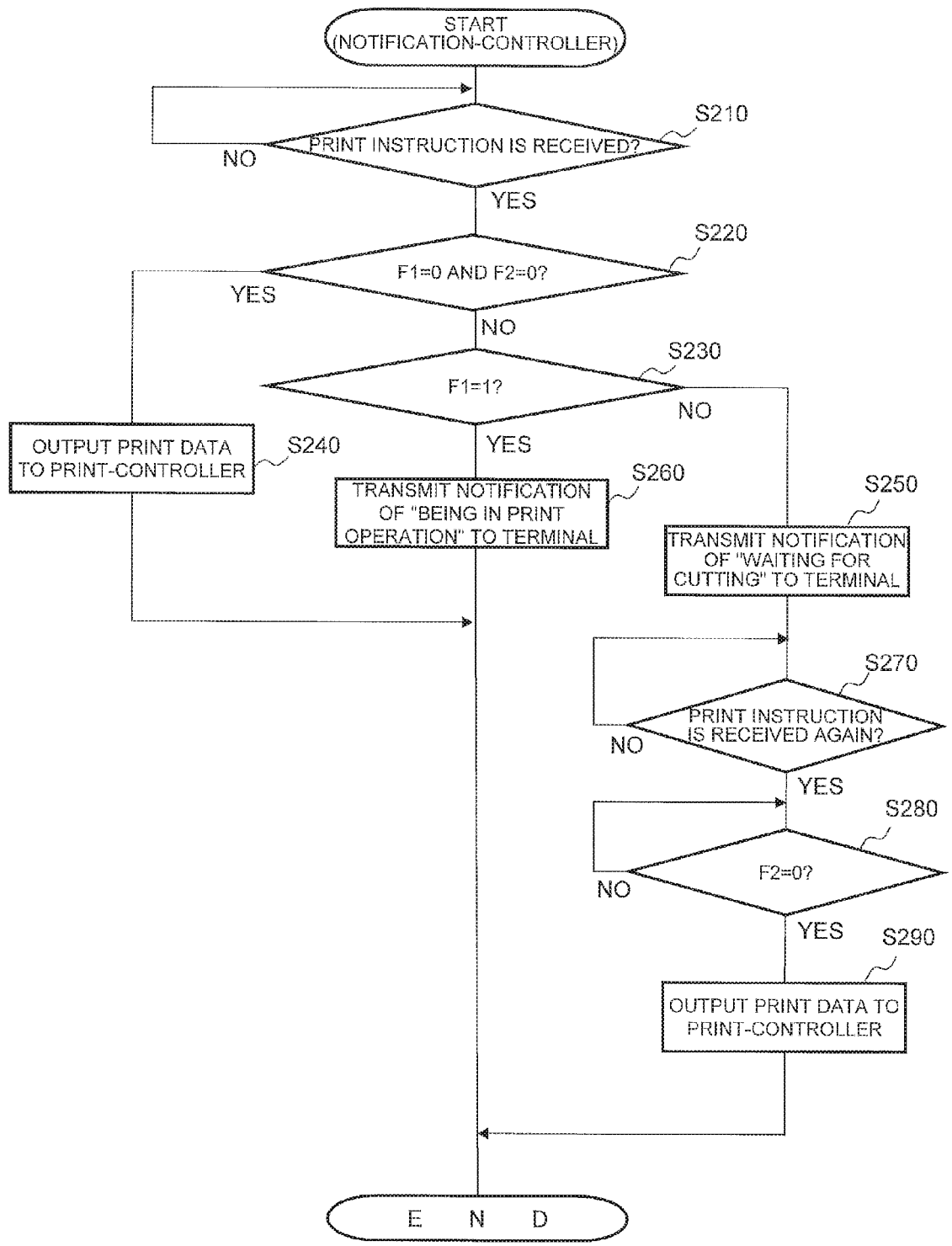
FIG. 10 is a flowchart of a control procedure executed by the notification-controller of the controller in a modification example in which a user transmits a print instruction again after a standby notification and performs a cut operation by himself/herself to start printing.
Figure 14:
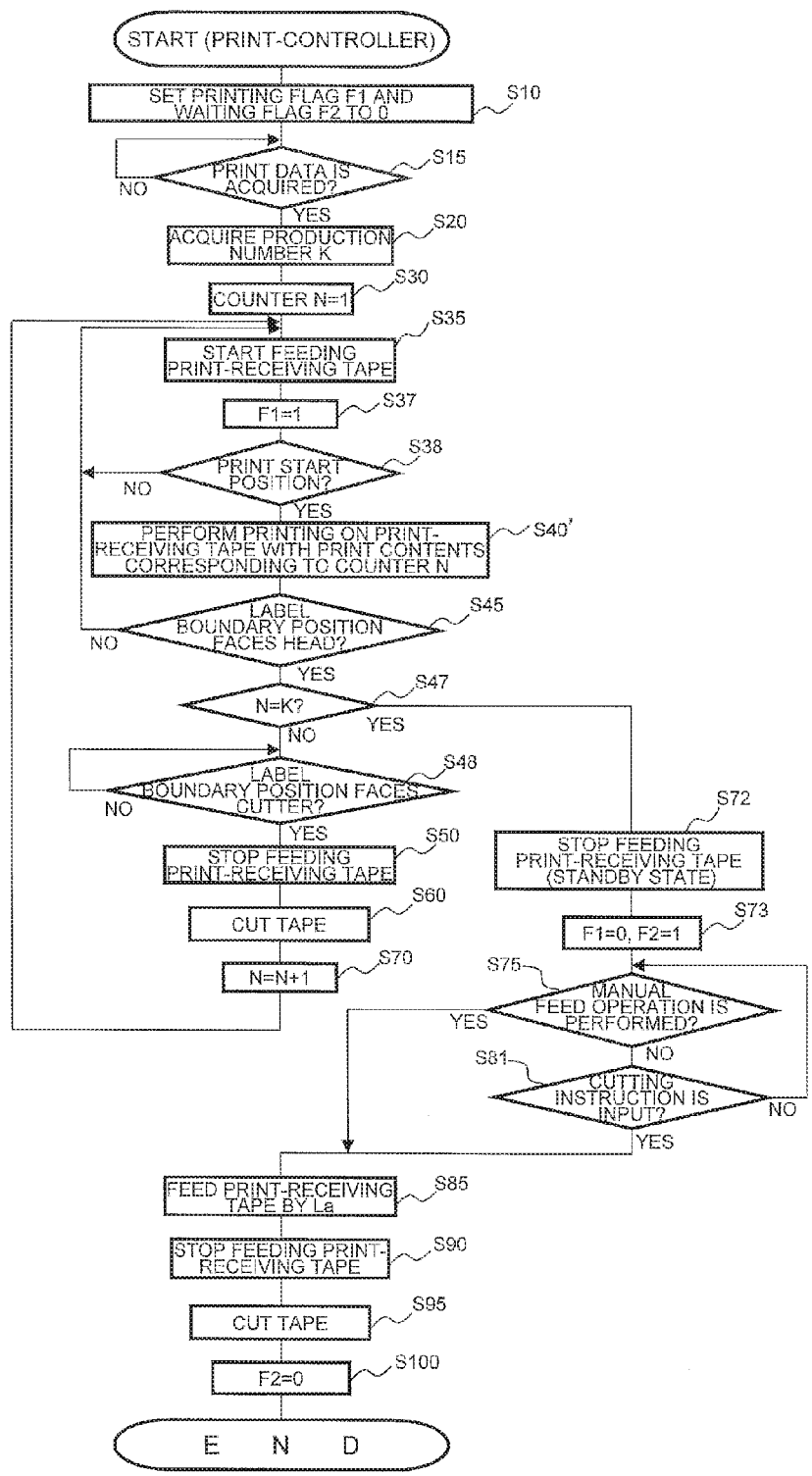
FIG. 14 is a flowchart of a control procedure executed by the print-controller of the controller.
Figure 15:
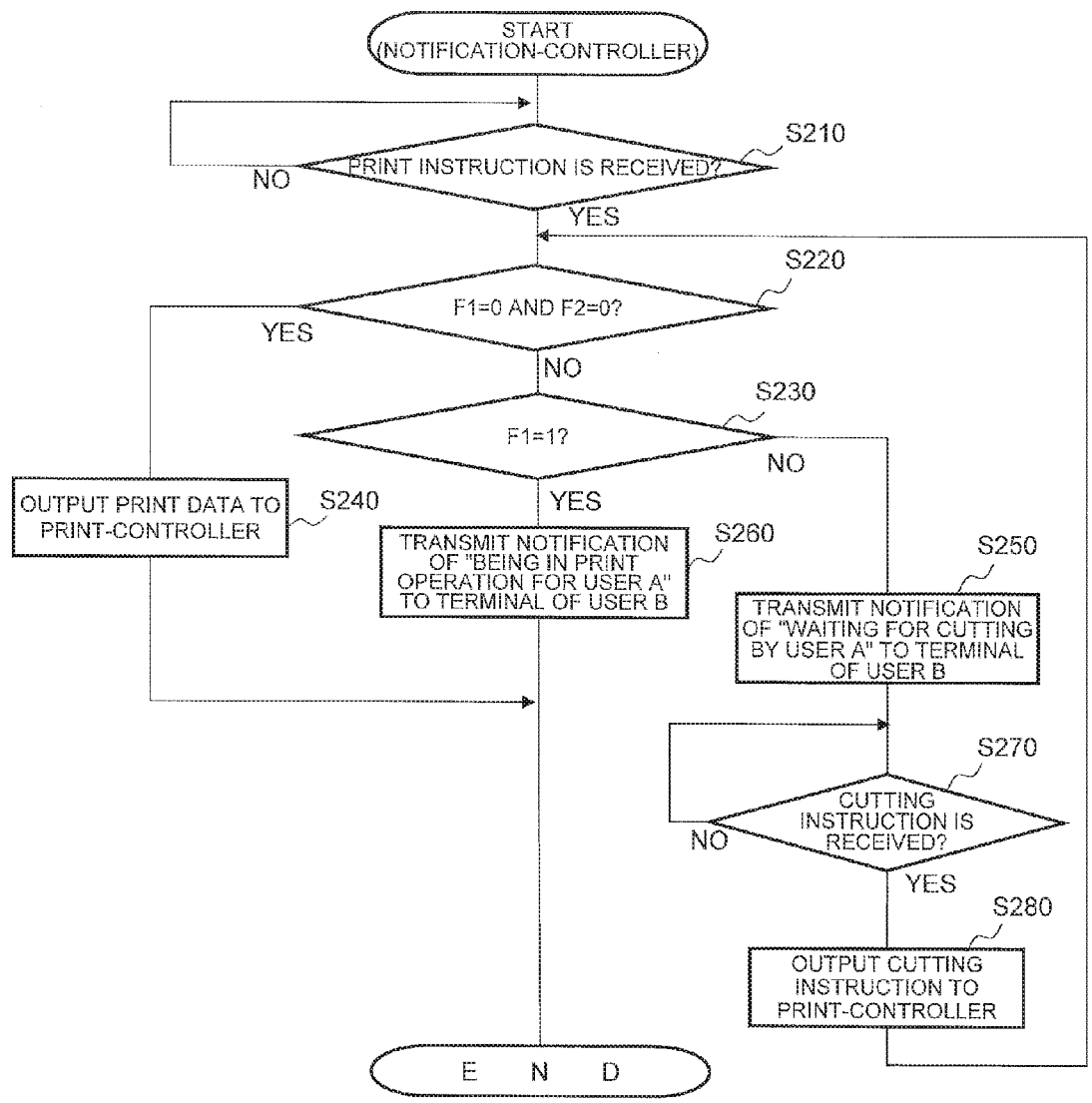
FIG. 15 is a flowchart of a control procedure executed by the notification-controller of the controller.

The above described controller 140 includes a print-controller 140A for carrying out controls of printing in a regular print mode of FIG. 9 and printing in a continuous print mode of FIG. 14 described later, and a notification-controller 140B for controlling transmission of various notifications (described later) to the operation terminal 300 as shown in FIGS. 8, 10, and 15 described later.

The operation terminal 300 includes a CPU 303, a memory 304 consisting of, for example, a RAM and a ROM, the above described operation part 302, the above described display part 301, a large-capacity storage device 305 consisting of a hard disk device etc. and storing various pieces of information, and a communication control part 306 transmitting/receiving information to/from the above described at least one tape printer 1 through the above described mutual recognition communication.

The CPU 303 executes a signal process in accordance with a program stored in the ROM in advance while using a temporary storage function of the RAM, thereby transmitting/receiving various instruction signals and information signals to/from the tape printer 1.

<Regular Print Mode and Continuous Print Mode>

The tape printer 1 having the above described configuration includes two modes, i.e., a regular print mode in which the print label L produced from the printed label tape 109 as described above is cut and separated from the printed label tape 109 positioned upstream thereof along a tape transport direction, and a continuous print mode in which a portion corresponding to the print label L (hereinafter also simply referred to as a "print label part Lo") is kept connected to the above described printed label tape 109 positioned upstream thereof without separating as described above. This embodiment is an embodiment when the above described regular print mode is used. Basic operation in the regular print mode will be described.

<Print Label Producing Operation in Regular Print Mode>

First, a producing operation of a print label in the above described regular print mode will be described with reference to FIGS. 5A to 5F. Actually, the above described base tape 101 is bonded by the feeding roller 27 and the pressure roller 28 to the print-receiving tape 103 on which a print is formed by the printing head 23 as described above to form (on the downstream side thereof) the printed label tape 109; however, to avoid complexity in FIGS. 5A to 5F, the tapes are shown in a simplified manner as one tape to which reference numeral "103(109)" is added (the same applies to FIGS. 6A to 6C, 11A to 11F, and 13A to 13D described later).

Figure 5A:
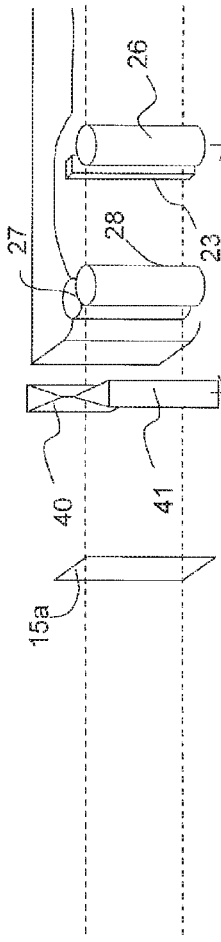
FIG. 5A is a view for explaining an example of a print label producing operation in a regular print mode.

FIG. 5A shows an initial position state (in which the print label L produced earlier has been cut). For example, when an appropriate print start instruction is input in this state, the feeding of the print-receiving tape 103, the base tape 101, and the printed label tape 109 (hereinafter also simply referred to as "tape feeding") is started. Additionally, the printing head 23 is accordingly energized as described above to start print formation of desired contents (alphabetical characters "ABCD" in this example) on a first tape portion 103a that is a printed tape portion including a predetermined print area on the print-receiving tape 103.

Figure 5B:
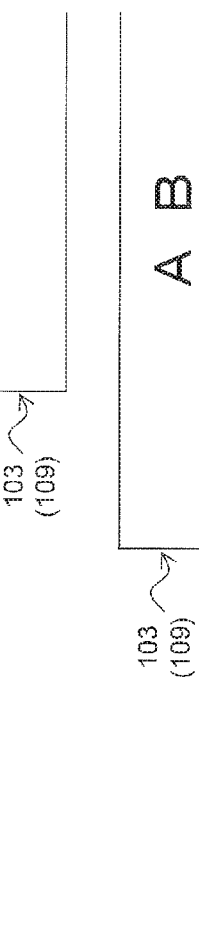
FIG. 5B is a view for explaining the example of the print label producing operation in the regular print mode.

FIG. 5B shows a state in which characters "A" and "B" of the above described "ABCD" are formed as described. When the tape feeding and the print formation further proceed, the print of all the characters "ABCD" is completed (see FIG. 5C). It is noted that FIG. 5C conceptually shows an end part on the transport-direction upstream side of a portion including the print of the above described "ABCD" and corresponding to the print label L (in other words, a boundary position between the above described printed tape portion corresponding to the print label L and a tape on the upstream side thereof) together as a broken line 203 (hereinafter also referred to as a "boundary position 203").

The energization of the printing head 23 is terminated in the above described print completion state and only the tape feeding is continuously performed. Subsequently, the feeding is continued until the above described boundary position faces the above described movable blade 41 and, when the boundary position faces the movable blade 41, the tape feeding is stopped and the tape is positioned (see FIG. 5D).

Subsequently, when the cut lever 50 is manually operated by a user, the movable blade 41 and the fixed blade 40 cooperate with each other to cut the above described boundary position (see FIG. 5E. as described above, actually, the printed label tape 109 including the print-receiving tape 103 and the base tape 101 is cut as a whole). As a result, the above described first tape portion 103a (the print label L) having the print "ABCD" formed thereon is separated from a second tape portion 103b that is an unprinted tape portion upstream of the above described boundary position on the print-receiving tape 103.

Figure 5C:
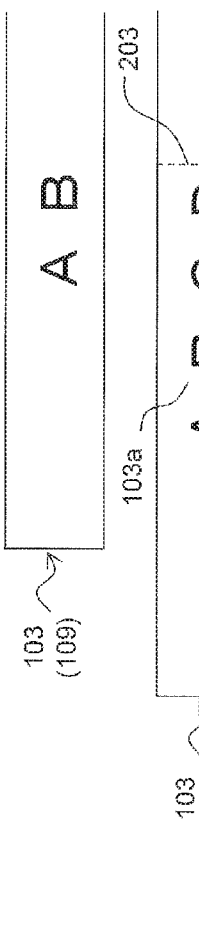
FIG. 5C is a view for explaining the example of the print label producing operation in the regular print mode.
Figure 5D:
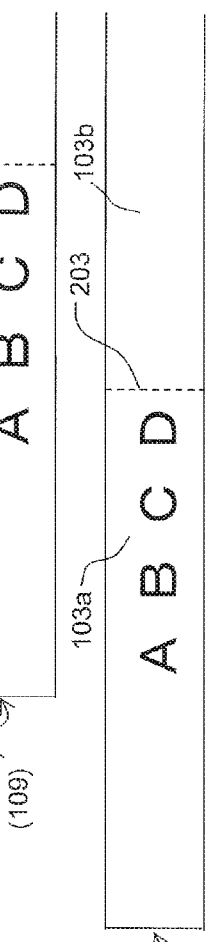
FIG. 5D is a view for explaining the example of the print label producing operation in the regular print mode.
Figure 5E:
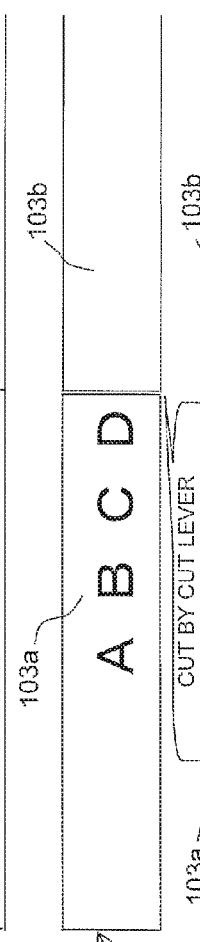
FIG. 5E is a view for explaining the example of the print label producing operation in the regular print mode.
Figure 5F:
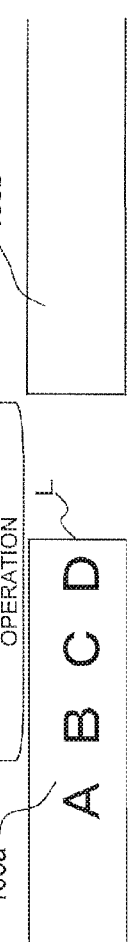
FIG. 5F is a view for explaining the example of the print label producing operation in the regular print mode.

As shown in FIG. 5F, the first tape portion 103a (i.e., the print label L) separated in this way is discharged to the outside of the housing 2 by a user holding with a hand and taking out a tip end part projected from the discharging exit 15a on the side surface of the lower cover 15.

<Background of Technique of This Embodiment>

Before describing a characteristic of this embodiment, i.e., a function of notifying the operation terminal 300 (specifically, an operation terminal 30B. described later) of the above described print formation process, feeding process, and standby process in execution in the tape printer 1, a background of the necessity of such a function will be described by using a comparison example shown in FIG. 6.

As described above, the tape printer 1 of this embodiment requires the manual operation of the cut lever 50 for cutting after the print formation on the printed label tape 109. However, for example, as shown in FIG. 6A, a previous operator, user A, may forget to cut the printed label tape 109 produced by operating an operation terminal 300A of the user A between a portion corresponding to the above described first tape portion 103a (a portion of print formation of text characters "ABCD" in the example of FIG. 6) and the second tape portion 103b of the printed label tape 109 upstream thereof and may leave the tape as it is.

In such a case, as shown in FIG. 6B, if another operator, user B, is in a place away from the tape printer 1, the user B may operate the operation terminal 300B of the user B to transmit a print instruction (a print instruction for producing a print label L including text characters "EFGH" in the example of FIG. 6) to the tape printer 1 without confirming that the above described cutting is not performed for the printed label tape 109 of the above described user A produced immediately before. In such a case, the above described first tape portion 103a (including the text characters "EFGH") is newly produced in accordance with the print instruction based on the operation of the above described user B on the upstream side of the above described first tape portion 103a (including the text characters "ABCD") produced immediately before in accordance with the operation of the user A in a connected state without cutting.

Such a state causes an inconvenience because, as shown in FIG. 6C, when going to the tape printer 1 to acquire the print label L (including the text characters "EFGH") corresponding to the above described print instruction, the user B notices the trouble of the above described connected state for the first time and is annoyed.

<Characteristic of This Embodiment>

To avoid the above described in convenience, this embodiment prevents the printed label tape 109 from being produced in the above described connected state even if a print instruction is transmitted from the operation terminal 300B to the tape printer 1 without cutting the printed label tape 109 produced immediately before as described above. This technique will hereinafter be described in detail.

In this embodiment, as shown in FIG. 7A corresponding to FIG. 6B described above, if the above described user A has forgotten to cut and left the printed label tape 109 (including the text characters "ABCD") and another user B transmits a print instruction for producing the print label L including the text characters "EFGH," the print data is not immediately acquired from the operation terminal 300B and a notification of the above described standby process in execution (i.e., being in standby and waiting for cutting) (corresponding to a second notification) is transmitted from the tape printer 1 to the operation terminal 300B. As a result, the display part 301 of the operation terminal 300B displays a message "CURRENTLY IN CUT WAITING STATE, UNABLE TO PRODUCE LABEL," for example. In this case, a standby period elapsed from the start of the above described standby process (or a time of start of standby. timed by timing means not shown) may be included in the above described second notification and transmitted to the operation terminal 300B.

As shown in FIG. 7B, if the above described user B transmits the print instruction for producing the print label L including the text characters "EFGH" while the text characters "ABCD" are being printed on the above described first tape portion 103a (while the print formation process or the feeding process is in execution), a notification of the above described print formation process or the feeding process in execution (i.e., being in a print operation) (corresponding to a first notification) is transmitted from the tape printer 1 to the operation terminal 300B (without acquiring the print data from the operation terminal 300B). As a result, the display part 301 of the operation terminal 300B displays a message "CURRENTLY IN PRINTING PROCESS, UNABLE TO PRODUCE LABEL," for example.

As shown in FIG. 7C, only when the above described user B transmits the print instruction for producing the print label L including the text characters "EFGH" while none of the above described print formation process, the above described feeding process, and the above described standby process is in execution in the tape printer 1, the print data included in the print instruction is acquired from the operation terminal 300B. The above described print formation process and feeding process corresponding to the print instruction are performed and the corresponding printed label tape 109 (including the text characters "EFGH") is produced. As a result, the user B can subsequently go to the tape printer 1 and manually operate the cut lever 50 as described above so as to cut the printed label tape 109 and acquire the print label L having the print "EFGH" formed thereon.

<Details of Control Carried Out by Controller>

Flowcharts of FIGS. 8 and 9 show control procedures executed by the above described notification-controller 140B and the above described print-controller 140A, respectively, of the controller 140 of the tape printer 1 to implement the above described technique.

<When Print Instruction is Given in Cut Waiting State>

Description will hereinafter be made of the case described with reference to FIG. 7A in which after the user A transmits a print instruction for producing the print label L including the text characters "ABCD" from the above described operation terminal 300A and the tape printer 1 completes the printing and enters a state of waiting for cutting by the user A, the user B transmits a print instruction for producing the print label L including the text characters "EFGH" from the operation terminal 300B.

First, at step S210 of FIG. 8, the notification-controller 140B determines whether a print instruction is received from the operation terminal 300. For example, when the print instruction for producing the above described print label L of "ABCD" is first received from the operation terminal 300A of the user A in accordance with the operation of the above described user A, this determination is affirmative (S210:YES) and the notification-controller 140B goes to step S220.

At step S220, the notification-controller 140B determines whether a print flag F1 and a standby flag F2 satisfy "F1=0 and F2=0". Before the print-controller 140A acquires print data from the notification-controller 140B, the flags are F1=0, F2=0 (see step S10 of FIG. 9) and, therefore, this determination is affirmative (S220:YES) immediately after the reception of the print instruction based on the operation of the above described user A and the notification-controller 140B goes to step S240.

At step S240, the notification-controller 140B outputs to the above described print-controller 140A the print data (including the text characters "ABCD") included in the print instruction based on the operation of the above described user A received at above described step S210 and terminates this flow.

On the other hand, going to FIG. 9, the print-controller 140A first initializes the print flag F1 and the standby flag F2 to 0 at step S10 as described above. Subsequently, the print-controller 140A goes to step S15.

At step S15, the print-controller 140A determines whether print data is input from the above described notification-controller 140B. As in the description of step S240 of FIG. 8 described above, if the print data (including the text characters "ABCD") included in the print instruction based on the operation of the above described user A is output and input from the above described notification-controller 140B, the determination of step S15 is affirmative (S15:YES) and the print-controller 140A acquires the above described input print data and goes to step S35. It is noted that "acquisition" in this case is a concept including predetermined analysis process and conversion process to be executed for print formation of the data described later rather than simply "inputting" or "receiving" the print data.

At step S35, the print-controller 140A starts feeding the print-receiving tape 103. Specifically, the print-controller 140A outputs a command signal instructing the transport roller driving circuit 35 to start driving so as to rotate the feeding roller driving shaft 108 via the transport roller motor 34, thereby starting the feeding of the above described print-receiving tape 103, the base tape 101, and the printed label tape 109.

At step S37, the print-controller 140A sets the print flag F1 to 1 indicative of being in the print process and goes to step S38.

At step S38, the print-controller 140A determines based on the above described print data acquired at above described step S15 whether the tapes started being fed as described above arrive at a print start position of the print-receiving tape 103. Specifically, the print-controller 140A determines with a known technique whether the downstream tip end part of the print area described above faces the position facing the printing head 23. If not arriving at the print start position, the determination is negative (S38:NO) and the print-controller 140A returns to step S35 to feed the above described tapes to the print start position. If arriving at the print start position, the determination is affirmative (S38:YES) and the print-controller 140A goes to step S40.

At step S40, print-controller 140A controls the printing head 23 via the print-head driving circuit 31 to form the print corresponding to the print data acquired at above described step S15 on the print-receiving tape 103. If the print data including the text characters "ABCD" is acquired from the print instruction based on the operation of the above described user A, the print formation of the text characters "ABCD" is performed on the print-receiving tape 103.

Subsequently, at step S45, the print-controller 140A further performs the tape feeding after completion of the print formation process of above described step S40 and determines whether the printing head 23 is faced by the above described boundary position 203 corresponding to a print end position on the print-receiving tape 103. If the printing head 23 is not faced by the above described boundary position 203, the determination is negative (S45:NO) and the print-controller 140A returns to step S35 to repeat the same procedure. On the other hand, if the printing head 23 is faced by the above described boundary position 203 (see FIG. 5C described above), the determination is affirmative (S45:YES) and the print-controller 140A goes to step S85.

At step S85, the print-controller 140A outputs a command signal instructing the above described transport roller driving circuit 35 to perform driving so as to start the transport roller motor 34 to rotate the feeding roller driving shaft 108, thereby performing the above described tape feeding by the distance La described above (corresponding to the separation distance between the printing head 23 and the movable blade 41).

Subsequently, going to step S90, the print-controller 140A outputs an instruction signal instructing the transport roller driving circuit 35 to stop driving so as to stop the feeding roller driving shaft 108 rotated by the transport roller motor 34 and terminate the above described tape feeding, thereby achieving the standby state of waiting for cutting by the movable blade 41.

Going to step S96, the print-controller 140A returns the above described print flag F1 to 0 and sets the above described standby flag F2 to 1 indicative of being in the standby process. Subsequently, the print-controller 140A goes to step S97.

At step S97, the print-controller 140A determines based on the detection result of the movable blade sensor 36 described above whether the above described movable blade 41 cuts the above described boundary position 203 in accordance with a manual operation of the above described cut lever 50. If the user A forgets to perform the manual operation as described above, the determination of step S97 is negative (S97:NO) and the print-controller 140A continues waiting in a loop.

Returning to FIG. 8, if the user B transmits the print instruction for producing the print label L including the text characters "EFGH" from the operation terminal 300B as described above in the state of waiting the manual operation of the cut lever 50 by the user A as described above, the determination of step S210 is affirmative (S210:YES) and the notification-controller 140B goes to step S220. Because of F1=0, F2=1 at this time point as described above, the determination of step S220 is negative (S22:NO) and the notification-controller 140B goes to step S230.

At step S230, the notification-controller 140B determines whether the print flag F1 is 1. Because of F1=0 at this time point as described above, the determination is negative (S230:NO) and the notification-controller 140B goes to step S250. At step S250, the notification-controller 140B transmits the above described second notification indicative of waiting for cutting by the user A to the operation terminal 300B of the user B. Subsequently, the notification-controller 140B terminates this flow.

<When Print Instruction is Given during Print Operation>

On the other hand, as described above with reference to FIG. 7B, if the user B transmits the print instruction for producing the print label L including the text characters "EFGH" from the operation terminal 300B in the middle of the print operation executed by the tape printer 1 in accordance with the print instruction transmitted by the user A from the operation terminal 300A, this case corresponds to the state from step S35 to step S90 described above with reference to FIG. 9. In this case, the above described print flag F1 is 1 and the above described standby flag F2 is 0. Therefore, when the print instruction based on the operation of the user B is received and the flow of FIG. 8 is started as described above, the determination of step S230 after step S210, step S220 is affirmative and the notification-controller 140B goes to step S260.

At step S260, the notification-controller 140B transmits the above described first notification indicative of being in the print operation (using the print data in the print instruction based on the operation of the user A) to the operation terminal 300B of the user B and terminates this flow.

<When Cutting is Completed>

Alternatively, as described above with reference to FIG. 7C, if the user B transmits the print instruction for producing the print label L including the text characters "EFGH" from the operation terminal 300B after the user A completes the cutting and removes the print label L produced by the user A, the determination of step S97 described above is affirmative (S97:YES) and the print-controller 140A stops waiting in the above described loop, returns the standby flag F2 to 0 at step S100, and terminates this flow. As a result, in this case, the above described print flag F1 is 0 (see step S96) and the above described standby flag F2 is 0. Therefore, when the print instruction based on the operation of the user B is received and the flow of FIG. 8 is started as described above, the determination of step S220 after step S210 is affirmative and, at step S240, the notification-controller 140B outputs to the above described print-controller 140A the print data (including the text characters "EFGH") included in the print instruction based on the operation of the above described user B receive at above described step S210 and terminates this flow.

Accordingly, because of input of the print data (including the text characters "EFGH") included in the print instruction based on the operation of the above described user B output from the above described notification-controller 140B, the determination of step S15 is affirmative (S15:YES), the print-controller 140A acquires the above described input print data and goes to step S35.

Subsequently, at step S40 after steps S35, S37, and S38 described above, the print-controller 140A controls the printing head 23 via the print-head driving circuit 31 to form the print of the text characters "EFGH" on the print-receiving tape 103 based on the print data acquired from the print instruction based on the operation of the above described user B (see FIG. 7C). At step S97 after steps S45, S85, S90, and S96 described above, the print-controller 140A enters a state of waiting for the manual operation of the cut lever 50 by the above described user B this time.

<Effect of This Embodiment>

As described above, this embodiment can avoid the inconvenience of the printed label tape 109 produced in the connected state as shown in FIG. 6C even if the next print instruction (the print instruction based on the operation of the user B in the example described above) is transmitted to the tape printer 1 while the printed label tape 109 produced immediately before (produced by the print instruction of the user A in the example described above) is left uncut as described above. As a result, user's convenience can be improved.

The present disclosure is not limited to the above described embodiment and may variously be modified without departing from the spirit and the technical ideas thereof. Such modification examples will hereinafter be described in order. In the modification examples, the portions equivalent to those of the above described embodiment are denoted by the same reference numerals and will not be described or will be described in a simplified manner as needed.

(1) When User B Transmits Print Instruction Again After Standby Notification and Performs Cut Operation by Himself/Herself to Start Printing A control procedure executed by the above described notification-controller 140B in this modification example is shown in FIG. 10 corresponding to FIG. 8 described above.

A flow of FIG. 10 has steps S270, S280, and S290 newly provided after step S250 in the flow of FIG. 8 described above. In particular, after transmitting the above described second notification to the operation terminal 300B of the user B at step S250 as in the example described above, the notification-controller 140B goes to step S270 to determine whether a new print instruction is received from the operation terminal 300B as is the case with above described step S210. If the user B viewing the above described second notification at step S250 operates the operation terminal 300B again to transmit the same print instruction (print instruction for producing the print label L including the text characters "EFGH") to the tape printer 1, the determination of step S270 is affirmative (S270:YES) and the notification-controller 140B goes to step S280.

At step S280, the notification-controller 140B determines whether the standby flag F2=0 is satisfied (i.e., whether the standby process is terminated). When the user B transmitting the print instruction as described above goes to the tape printer and manually operate the cut lever 50 to cut the portion of "ABCD" (corresponding to the print instruction of the user A) of the above described printed label tape 109, the notification-controller 140B stops waiting in a loop at step S97 of FIG. 9 described above and sets the flag F2=0 at step S100. As a result, the determination of above described step S280 is affirmative (S280:YES) and the notification-controller 140B goes to step S290.

At step S290, as is the case with above described step S240, the notification-controller 140B outputs to the above described print-controller 140A the print data (including the text characters "EFGH") included in the print instruction based on the operation of the above described user B received at above described step S270 and terminates this flow. As a result, since the determination of step S15 is affirmative (S15:YES) in the flow of FIG. 9 described above and the following procedure is executed as described above, the printed label tape 109 (the print label L after being cut by the manual operation) including the text characters "EFGH" intended by the user B can be produced. This modification example provides the same effect as the above described embodiment.

(2) When Printed Label Tape is Forcibly Cut in Accordance with Cutting Instruction Based on Operation of User B As described above, the above described tape printer 1 includes two modes, i.e., the above described regular print mode and the above described continuous print mode. The case of applying this modification example to the above described continuous print mode will hereinafter be described with reference to FIGS. 11A to 15. In association with execution of the continuous print mode, as indicated by imaginary lines in FIG. 4, the tape printer 1 is disposed with a cutter driving solenoid 37 driving the above described movable blade 41 to perform the above described cutting operation and a cutter solenoid driving circuit 38 carrying out drive control of the cutter driving solenoid 37.

<Operation of Producing Multiple Print Labels in Continuous Print Mode>

First, a print label producing operation of this modification example in the above described continuous print mode will be described with reference to FIGS. 11A to 11F. For simplification of description, the operation will be described by taking as an example the case that the above described one print instruction is input for producing a plurality of (in this example, three) print labels including the alphabetical characters "ABCD" as is the case with FIGS. 5A to 5F described above.

As described with reference to FIGS. 5A to 5C, when the above described print start instruction is input, the tape feeding is started and the print formation of "ABCD" is started on the first tape portion 103a of the print-receiving tape 103. In this example, suitable cut marks 205 (two triangles facing each other in this example) are preliminarily formed at a transport-direction downstream tip end of the leading first tape portion 103a (i.e., the start position of the print area). When the print of all the characters of the above described "ABCD" is completed as described above, the energization of the printing head 23 is terminated and, in this continuous print mode, the tape is slightly fed until a position corresponding to the above described boundary position (see the broken line 203 of FIG. 5) faces the printing head 23. FIG. 11A shows a state after this feeding corresponding to FIG. 5C.

Unlike FIG. 5C described above, since the feeding is not stopped and the cutting by the movable blade 41 is not performed, the above described print label part Lo produced is kept connected to the subsequent printed label tape 109. The tape feeding is further continued and the print formation of "ABCD" is started again on the similar first tape portion 103a subsequent to (=that is the second one after) the first tape portion 103a described above on the print-receiving tape 103 (see FIG. 11B). In the middle of the print formation of "ABCD" on the second one of the first tape portions 103a, when the boundary with the leading first one of the first tape portions 103a (position corresponding to the above described boundary position) faces the above described movable blade 41, the tape feeding is stopped (see FIG. 11C). In this feeding stop state, the above described cutter solenoid driving circuit 38 drives the movable blade 41 via the cutter driving solenoid 37 under the control of the above described print-controller 140A to perform the automatic cutting of the printed label tape 109, so that the above described print label part Lo downstream of the cutting position (on the left side of FIG. 11C) is separated from the other portion, and a first one of the print labels L is produced.

Subsequently, as shown in FIGS. 11D and 11E, the same process as described above is repeated to produce a second one of the print labels L.

For the last one of the three labels, the above described automatic cutting is not performed and the print label part Lo is put into a standby state (state of waiting for cutting by manual operation) in the connected form with the printed label tape 109 upstream thereof. In particular, as described above, when the print of the characters of the above described "ABCD" is completed, the energization of the printing head 23 is terminated and, when the feeding further proceeds and a position corresponding to the above described boundary position faces the printing head 23, the tape feeding is stopped (see FIG. 11F).

If a user desires and intends to take out the last one of the three print label parts Lo, the user manually operates a suitable key out of the above described functional keys 4 to perform the above described tape feeding (so-called tape feeding operation. not shown) until the upstream end part of the third one of the print label parts Lo is at a position facing the above described movable blade 41. As a result, the above described third one of the print label parts Lo can be separated from the upstream printed label tape 109 by operating the cut lever 50, so as to acquire a third one of the print labels L.

<Characteristic of Technique of This Modification Example>

In this modification example, first, as shown in FIG. 12A, it is assumed that the user A transmits, for example, a print instruction intended to produce three print labels "ABCD" as in the above described example. It is also assumed that while the user A forgets to cut the last one of the three print label parts Lo with manual operation and leaves the print label part Lo after two print labels L (including the text characters "ABCD") are produced by automatic cutting as described above, another user B transmits a print instruction (including the print data of "EFGH") for producing the print label L including the text characters "EFGH." In this case, as is the case with FIG. 7A of the above described embodiment, the print data is not immediately acquired from the operation terminal 300B and a notification of the above described standby process in execution (i.e., being in standby and waiting for cutting) (corresponding to the second notification) is transmitted from the tape printer 1 to the operation terminal 300B. As a result, the display part 301 of the operation terminal 300B displays, for example, a message "CURRENTLY IN CUT WAITING STATE, UNABLE TO PRODUCE LABEL" as described above.

In this modification example, as shown in FIG. 12B, by transmitting a cutting instruction for causing a cutting operation of the third one of the print label parts Lo from the operation terminal 300B to the tape printer 1 based on the operation of the user B, the cutter solenoid driving circuit 38 can drive the movable blade 41 via the cutter driving solenoid 37 to perform the automatic cutting (i.e., forced cutting) of the printed label tape 109. As a result, the above described print label part Lo is separated from the other portion, and the third one of the print labels L is generated (i.e., the production work for the three print labels L intended by the user A is completed). As a result, as shown in FIG. 12C, after the above description, the above described print instruction is transmitted again from the operation terminal 300B in accordance with the operation of the user B, the print label L including the text characters "EFGH" can be produced.

<Detailed Behavior of Forced Cutting>

FIGS. 13A to 13D show detailed behavior of the above described forced cutting. As described above, when the cutting instruction from the operation terminal 300B is received as described above in the above described cut waiting state with the upstream end part of the third one of the print label parts Lo (i.e., the above described boundary position. indicated by the broken line 203) facing the printing head 23, the tape feeding is resumed (see FIG. 13A). The feeding is stopped when the upstream end part of the above described print label part Lo faces the movable blade 41 (see FIG. 13B). The movable blade 41 is driven via the cutter driving solenoid 37 as described above to automatically cut the printed label tape 109 at the above described boundary position, thereby producing the third one of the print labels L (see FIG. 13C). As a result, the user can separate and acquire the above described third one of the print labels L from the printed label tape 109 upstream thereof after cutting (see FIG. 13D).

<Details of Control Carried Out by Print-Controller>

A control procedure executed by the above described print-controller 140A in this modification example will be described with a flowchart of FIG. 14 corresponding to FIG. 9 described above. The procedures equivalent to those of FIG. 9 are denoted by the same reference numerals and will not be described or will be described in a simplified manner as needed.

At steps S10 and S15 same as FIG. 8 described above, the print-controller 140A initializes the print flag F1 to 0 and the standby flag F2 to 0 and then determines whether print data is input from the above described notification-controller 140B and, if the print data included in the print instruction is input, the print-controller 140A acquires the above described input print data and goes to newly provided step S20.

At step S20, the print-controller 140A acquires the production number K of the print labels L specified in the print instruction input at above described step S15. For example, in the example shown in FIG. 12, the print instruction of the user A has K=3 and the print instruction of the user B has K=1. Subsequently, the print-controller 140A goes to step S30.

At step S30, the print-controller 140A substitute 1 for a counter variable N corresponding to the number of print processes on the print-receiving tape 103 (in other words, the number of times of production of the print labels L).

Subsequently, at steps S35, S37, and S38 same as FIG. 8 described above, the print-controller 140A starts feeding the print-receiving tape 103, sets the print flag F1=1, determines whether the print-receiving tape 103 arrives at the print start position, and then goes to step S40'.

At step S40', the print-controller 140A controls the printing head 23 via the print-head driving circuit 31 as is the case with above described step S40 to form on the print-receiving tape 103 the print having contents corresponding to the counter N at this time point out of the print data acquired at above described step S15. The print instruction of the above described user A forms the same text characters "ABCD" at all the values of N=1, 2, and 3 (this is not a limitation, and the characters may be different from each other) and the print instruction of the above described user B forms the text characters "EFGH" at N=1. Subsequently, at step S45 same as FIG. 8 described above, the print-controller 140A confirms that the above described boundary position 203 faces the printing head 23, and then goes to newly provided step S47.

At step S47, the print-controller 140A determines whether the value of the counter variable N at this time point is the same as the production number K acquired at above described step S30. In other words, the production of the print labels L (or the print label parts Lo) are completed for the production number K. If the value of the counter variable N reaches the production number K, the determination is affirmative (S47:YES) and the print-controller 140A goes to step S72 described later. If the value of the counter variable N does not reach the production number K, the determination is negative (S47:NO) and the print-controller 140A goes to step S48.

At step S48, the print-controller 140A further feeds the print-receiving tape 103 and determines whether the movable blade 41 is faced by the boundary position 203 corresponding to the above described print end position on the print-receiving tape 103. If the movable blade 41 is not faced by the boundary position 203, the determination is negative (S48:NO) and the print-controller 140A waits in a loop. If the movable blade 41 is faced by the boundary position 203, the determination is affirmative (S48:YES) and the print-controller 140A goes to step S50.

At step S50, the print-controller 140A stops feeding the print-receiving tape 103. Specifically, the print-controller 140A outputs a command signal instructing the transport roller driving circuit 35 to stop driving so as to stop the feeding roller driving shaft 108 via the transport roller motor 34, thereby stopping the feeding of the above described print-receiving tape 103, the base tape 101, and the printed label tape 109.

Subsequently, at step S60, the print-controller 140A cuts the printed label tape 109 including the print-receiving tape 103 after the print formation at above described step S40'. Specifically, the print-controller 140A outputs a command signal to the cutter solenoid driving circuit 38. As a result, the movable blade 41 is actuated by the drive force of the cutter driving solenoid 37, and the upstream end part of the above described first tape portion 103a is cut (see, e.g., FIGS. 11C and 11E).

Going to step S70, the print-controller 140A adds 1 to the value of the counter variable N and then return to step S35 to repeat the same procedure.

On the other hand, at step S72 after the affirmative determination of step S47, the print-controller 140A outputs the command signal instructing the transport roller driving circuit 35 to stop driving so as to stop the feeding roller driving shaft 108 via the transport roller motor 34 as is the case with above described step S50, thereby stopping the feeding of the above described print-receiving tape 103, the base tape 101, and the printed label tape 109.

Subsequently, at step S73, the print-controller 140A returns the above described print flag F1 to 0, sets the standby flag F2 to 1 indicative of being in the standby process, and then goes to step S75.

At step S75, the print-controller 140A determines whether a feed process is executed by a suitable manual key operation to the functional keys 4. If the feed process is executed, the determination is affirmative (S75:YES) and the print-controller 140A goes to step S85 described later. If the feed process is not executed, the determination is negative (S75:NO) and the print-controller 140A goes to step S81.

At step S81, the print-controller 140A determines whether a cutting instruction is input from the notification-controller 140B (see step S280 of FIG. 15 described later). If the cutting instruction is not input the determination is negative (S81:NO) and the print-controller 140A returns to above described step S75 to repeat the same procedure. If the cutting instruction is input, the determination is affirmative (S81:YES) and the print-controller 140A goes to step S85.

At step S85, the print-controller 140A performs the above described tape feeding by the distance La described above (corresponding to the separation distance between the printing head 23 and the movable blade 41) as is the case with FIG. 8 described above.

Subsequently, at step S90, the print-controller 140A stops the tape feeding as is the case with FIG. 8 described above. As a result, the above described boundary position 203 of the above described printed label tape 109 fed by the distance La arrives at the position facing the movable blade 41. Subsequently, the print-controller 140A goes to newly provided step S95.

At step S95, the print-controller 140A cuts the printed label tape 109 including the print-receiving tape 103 as is the case with above described step S60. Specifically, the print-controller 140A outputs a command signal to the cutter solenoid driving circuit 38. As a result, the movable blade 41 is actuated by the drive force of the cutter driving solenoid 37 to cut the above described boundary position 203 (see FIG. 13C).

Subsequently, going to step S100, the print-controller 140A returns the standby flag F2 to 0 corresponding to the termination of the standby process and terminates this flow. Because F2=0 is set in this way, the determination of step S220 of FIG. 15 described above is affirmative in the case of F1=0, and the notification-controller 140B outputs the print data to the print-controller 140A at step S240.

<Details of Control Carried Out by Notification-Controller>

A control procedure executed by the above described notification-controller 140B in this modification example will be described with a flowchart of FIG. 15 corresponding to FIG. 8 described above. The procedures equivalent to those of FIG. 8 are denoted by the same reference numerals and will not be described or will be described in a simplified manner as needed.

The flow shown in FIG. 15 is different in that step S270 and step S280 are newly provided after step S250 of the flow of FIG. 8 described above. In particular, after the notification-controller 140B goes through steps S210, S220, and S230 to step S250 and transmits to the operation terminal 300B of the user B the above described second notification indicative of waiting for the cut operation by the user A as in the example described above, the notification-controller 140B goes to newly provided step S270.

At step S270, the notification-controller 140B determines whether a cutting instruction (specifically, a cutting instruction for cutting the third one of the print label parts Lo corresponding to the last one of the above described multiple labels) is received from the operation terminal 300B of the user B receiving the above described second notification transmitted at above described step S250. If the cutting instruction is not received, the determination is negative (S270:NO) and the notification-controller 140B waits in a loop until the cutting instruction is received. If the cutting instruction is received, the determination is affirmative (S270:YES) and the notification-controller 140B goes to step S280.

At step S280, the notification-controller 140B outputs the cutting instruction received at above described step S270 to the print-controller 140A. As a result, the determination of input of the cutting instruction described above becomes affirmative at step S81 of FIG. 14 and the subsequent procedure of step S85 is executed. Subsequently, the notification-controller 140B returns to step S220 to repeat the same procedure.

This modification example provides the same effect as the above described embodiment.

Although the description has been made of the case of applying the technique of this modification example (the forced cutting based on the cutting instruction from the operation terminal 300B) to the continuous print mode, this is not a limitation, and the technique may be applied to the regular print mode described with reference to FIG. 5. Conversely, the technique of the above described embodiment may be applied to the print label part Lo last in order when a plurality of the print labels L is produced in the above described continuous print mode. In each of these cases, the same effect as described above is provided.

(3) When Print Data Acquisition State is Made Variable in Accordance with Connection Form In particular, in this modification example, for example, a CPU of the above described controller 140 determines whether a connection form between the communication control part 306 of the operation terminal 300B and the communication control part 142 of the tape printer 1 is connection through a wireless LAN (or a wired LAN) or connection through a USB cable. If it is determined that the connection form is the wireless LAN (or wired LAN) connection, the above described first notification at above described step S260 or the above described second notification at above described step S250 is transmitted as shown in the flow of FIG. 8 described above in accordance with the determination result of step S220 and step S230 (determination that any of the print formation process, the feeding process, and the standby process is in execution). On the other hand, if it is determined that the connection form is the connection through a USB cable, the output of the print data to the print-controller 140A at above described step S240 is performed even when it is determined that any of the print formation process, the feeding process, and the standby process is in execution as described above, and the print data in the print instruction is acquired at step S15 in the flow of FIG. 9. This has the following significance. In the case of the connection through a USB cable, a user is highly possibly present within a distance range in which the tape printer 1 can visually be observed. Therefore, if a print instruction is received during execution of any of the print formation process, the feeding process, and the standby process, it is very likely that the user is intentionally performing the continuous printing rather than forgetting the cutting as described above. Therefore, an appropriate process suited to the user's intention can be performed by executing the process described above.

(4) When Notification is Made to Previous User Forgetting Manual Operation and Leaving Tape In particular, in this modification example, as described above, if the above described standby flag F2 is 1 and the determination of step S230 of FIG. 8 or FIG. 15 is negative (in other words, if it is determined that the above described standby process is in execution), the above described second notification is transmitted to the above described operation terminal 300B of the user B at above described step S250. Concurrently, a third notification corresponding to the transmission of the above described second notification is transmitted to the operation terminal 300A of the above described user A that is the transmission source of the print instruction related to execution of the print formation process preceding the above described standby process. As a result, the display part 301 of the operation terminal 300A of the user A receiving the above described third notification displays, for example, a message "SOMEONE IS WAITING FOR YOUR CUTTING OPERATION!". As a result, the user A forgetting the cutting can reliably be informed.

(5) Others

The arrows shown in FIG. 4 indicate an example of signal flow and are not intended to limit the signal flow directions.

The flowcharts shown in FIG. 8, FIG. 9, FIG. 10, FIG. 14, and FIG. 15 are not intended to limit the present disclosure to the procedures shown in the above described flows and the procedures may be added/deleted or may be executed in different order without departing from the spirit and the technical ideas of the disclosure.

The techniques of the above described embodiment and the modification examples may appropriately be utilized in combination other than those described above.

What is claimed is:

1. A printer comprising:
a feeder configured to feed a print-receiving tape;
a printing head that is configured to perform printing on said print-receiving tape and is disposed on a feeding path of said feeder;
a cutter that is configured to cut said print-receiving tape in a thickness direction and is disposed downstream of said printing head along said feeding path;
a communication device configured to perform mutual recognition communication including connection authentication with at least one operation terminal; and
a controller;
said controller being configured to execute:
a reception process for receiving a first print instruction from a first operation terminal by said mutual recognition communication via said communication device;
a determination process for determining whether any of:
(i) a print formation process for performing a desired print formation while feeding said print-receiving tape,
(ii) a feeding process for further feeding said print-receiving tape after completion of said print formation process such that said print-receiving tape is positioned by stopping the feeding when a boundary position faces said cutter wherein the boundary position is defined as a boundary between a printed tape portion having said desired print formed thereon and an unprinted tape portion in said print-receiving tape, and
(iii) a standby process for waiting for, after positioning in said feeding process, said cutter to cut said boundary position to separate said printed tape portion from said unprinted tape portion located upstream than said boundary position after the cutting in a feeding direction,
is being executed based on a second print instruction from a second operation terminal preceding said first print instruction when said first print instruction is received in said reception process;
a first notification transmission process for, in the case that it is determined in the determination process that said print formation process or said feeding process is in execution, transmitting a first notification indicative of being in a print operation to said first operation terminal by said mutual recognition communication via said communication device;
a second notification transmission process for, in the case that it is determined in the determination process that said standby process is in execution, transmitting a second notification indicative of being in standby and waiting for cutting to said first operation terminal by said mutual recognition communication via said communication device;
a data acquisition process for, in the case that it is determined in said determination process that none of said print formation process, said feeding process, and said standby process is in execution, acquiring print data included in said first print instruction received in said reception process; and
a coordination control process for controlling said feeder and said printing head in a coordinated manner such that said print formation process and said feeding process are executed by using said print data acquired in said data acquisition process.

2. The printer according to claim 1, further comprising a timer configured to detect a standby start time at which said standby process is started or a standby period elapsed from start of said standby process, wherein
in said second notification transmission process, said second notification including said standby start time or said standby period detected by said timer is transmitted to said first operation terminal.

3. The printer according to claim 1, wherein:
said cutter is a manual cutter configured to perform a cutting operation in conjunction with an operation of an operation lever,
said printer further comprises a cutting sensor configured to detect that said manual cutter enters a cutting completion state,
said determination process is configured to determine that said standby process is terminated when said cutting sensor detects said cutting completion state of said manual cutter,
in the case that it is determined in said determination process that said standby process is terminated when a third print instruction is received from said first operation terminal in said reception process after said second notification is transmitted to said first operation terminal in said second notification transmission process, print data included in said third print instruction is acquired in said data acquisition process, and
in said coordination control process, said feeder and said printing head are controlled in a coordinated manner such that said print formation process and said feeding process are executed by using said print data included in said third print instruction, the print data being acquired in said data acquisition process.

4. The printer according to claim 1, wherein:
said cutter is an automatic cutter configured to perform a cutting operation with a drive force generated by a cutting driving device,
said controller is configured to further execute a cutting control process for, in the case that a cutting instruction for performing said cutting operation is received from said first operation terminal in said reception process after said second notification is transmitted to said first operation terminal in said second notification transmission process, controlling said cutting driving device to drive said automatic cutter to cut said boundary position of said print-receiving tape in said standby process,
said determination process is configured to determine that said standby process is terminated when said automatic cutter cuts said boundary position by the control of said cutting control process,
in the case that it is determined in said determination process that said standby process is terminated when a fourth print instruction is received from said first operation terminal in said reception process after said second notification is transmitted to said first operation terminal in said second notification transmission process, print data included in said fourth print instruction is acquired in said data acquisition process, and in said coordination control process, said feeder and said printing head are controlled in a coordinated manner such that said print formation process and said feeding process are executed by using said print data included in said fourth print instruction, the print data being acquired in said data acquisition process.

5. The printer according to claim 4, wherein
in said determination process, when said controller outputs a command signal to drive said cutting driving device, it is determined that said standby process is terminated by regarding that the said automatic cutter cuts said boundary position.

6. The printer according to claim 1, wherein
said controller is configured to further execute a connection determination process for determining whether a type of connection between said communication device and said first operation terminal is a wireless LAN, a wired LAN connection, or a USB connection, in the case that it is determined in said connection determination process that said type of connection is said wireless LAN or said wired LAN connection, said first notification in said first notification transmission process or said second notification in said second notification transmission process is performed in accordance with a determination result in said determination process, and in the case that it is determined in said connection determination process that said type of connection is said USB connection, print data included in said first print instruction received in said reception process is acquired in said data acquisition process even when it is determined in said determination process that any of said print formation process, said feeding process, and said standby process is in execution.

7. The printer according to claim 1, wherein
said controller is configured to further execute a third notification transmission process for, in the case that it is determined in said determination process that said standby process is in execution, transmitting a third notification corresponding to transmission of said second notification to said first operation terminal is transmitted by said mutual recognition communication via said communication device to said second operation terminal that is a transmission source of said second print instruction related to execution of said print formation process preceding the standby process.

* * * * *